US010824429B2

(12) United States Patent
Gupta et al.

(10) Patent No.: US 10,824,429 B2
(45) Date of Patent: Nov. 3, 2020

(54) COMMIT LOGIC AND PRECISE EXCEPTIONS IN EXPLICIT DATAFLOW GRAPH EXECUTION ARCHITECTURES

(71) Applicant: Microsoft Technology Licensing, LLC, Redmond, WA (US)

(72) Inventors: Gagan Gupta, Bellevue, WA (US); David T. Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 16/224,600

(22) Filed: Dec. 18, 2018

(65) Prior Publication Data
US 2020/0089503 A1   Mar. 19, 2020

Related U.S. Application Data

(60) Provisional application No. 62/733,585, filed on Sep. 19, 2018.

(51) Int. Cl.
  *G06F 15/82* (2006.01)
  *G06F 9/38* (2018.01)
  *G06F 9/30* (2018.01)
(52) U.S. Cl.
  CPC ........ *G06F 9/3838* (2013.01); *G06F 9/30101* (2013.01); *G06F 9/3804* (2013.01); *G06F 9/3857* (2013.01); *G06F 15/825* (2013.01)
(58) Field of Classification Search
  CPC .................................................. G06F 15/825
  See application file for complete search history.

(56) References Cited

U.S. PATENT DOCUMENTS

| 5,247,628 A | 9/1993 | Grohoski |
| 5,615,350 A | 3/1997 | Hesson |

(Continued)

FOREIGN PATENT DOCUMENTS

| WO | WO 2014/193878 | 12/2014 |
| WO | WO 2015/069583 | 5/2015 |

(Continued)

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).

(Continued)

*Primary Examiner* — Jacob Petranek
(74) *Attorney, Agent, or Firm* — Klarquist Sparkman, LLP

(57) ABSTRACT

Systems and methods are disclosed for executing instructions with a block-based processor. Instructions can be executed in any order as their dependencies arrive, but the individual instructions are committed in a serial fashion. Further, exception handling can be performed by storing transient state for an instruction block and resuming by restoring the transient state. This allows programmers to see intermediate state for the instruction block before the subject block has committed. In one examples of the disclosed technology, a method of operating a processor executing a block-based instruction set architecture includes executing at least one instruction encoded for an instruction block, responsive to determining that an individual instruction of the instruction block can commit, advancing a commit frontier for the instruction block to include all instructions in the instruction block that can commit, and committing one or more instructions inside the advanced commit frontier.

15 Claims, 24 Drawing Sheets

(56) References Cited

U.S. PATENT DOCUMENTS

| | | | |
|---|---|---|---|
| 5,790,822 A | 8/1998 | Sheaffer et al. | |
| 5,796,997 A | 8/1998 | Lesartre et al. | |
| 5,809,450 A | 9/1998 | Chrysos et al. | |
| 5,845,103 A | 12/1998 | Sodani et al. | |
| 5,943,501 A | 8/1999 | Burger et al. | |
| 6,016,399 A | 1/2000 | Chang | |
| 6,061,776 A | 5/2000 | Burger et al. | |
| 6,161,170 A | 12/2000 | Burger et al. | |
| 6,164,841 A | 12/2000 | Mattson et al. | |
| 6,493,820 B2 | 12/2002 | Akkary et al. | |
| 6,529,922 B1 | 3/2003 | Hoge | |
| 6,918,032 B1 | 7/2005 | Abdallah et al. | |
| 6,965,969 B2 | 11/2005 | Burger et al. | |
| 6,988,183 B1 | 1/2006 | Wong | |
| 7,032,217 B2 | 4/2006 | Wu | |
| 7,299,458 B2 | 11/2007 | Hammes | |
| 7,380,038 B2 | 5/2008 | Gray | |
| 7,415,576 B2 | 8/2008 | Kamei et al. | |
| 7,676,650 B2 | 3/2010 | Ukai | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 8,055,881 B2 | 11/2011 | Burger et al. | |
| 8,055,885 B2 | 11/2011 | Nakashima | |
| 8,060,730 B2 | 11/2011 | Moyer et al. | |
| 8,127,119 B2 | 2/2012 | Burger et al. | |
| 8,180,997 B2 | 5/2012 | Burger et al. | |
| 8,201,024 B2 | 6/2012 | Burger et al. | |
| 8,250,555 B1 | 8/2012 | Lee et al. | |
| 8,321,850 B2 | 11/2012 | Bruening et al. | |
| 8,424,015 B2 | 4/2013 | Arndt et al. | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,578,389 B1 | 11/2013 | Boucher | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 9,448,797 B2 | 9/2016 | Greiner et al. | |
| 9,471,371 B2 | 10/2016 | Busaba et al. | |
| 2006/0112261 A1 | 5/2006 | Yourst et al. | |
| 2007/0234018 A1 | 10/2007 | Feiste | |
| 2009/0013135 A1 | 1/2009 | Burger et al. | |
| 2009/0013160 A1 | 1/2009 | Burger et al. | |
| 2009/0217020 A1 | 8/2009 | Yourst | |
| 2010/0122073 A1 | 5/2010 | Narayanaswamy et al. | |
| 2010/0146209 A1 | 6/2010 | Burger et al. | |
| 2010/0325395 A1 | 12/2010 | Burger et al. | |
| 2010/0325608 A1 | 12/2010 | Radigan | |
| 2011/0060889 A1 | 3/2011 | Burger et al. | |
| 2011/0072239 A1 | 3/2011 | Burger et al. | |
| 2011/0078424 A1 | 3/2011 | Boehm et al. | |
| 2011/0209151 A1 | 8/2011 | Chung et al. | |
| 2012/0303933 A1 | 11/2012 | Manet et al. | |
| 2012/0311306 A1 | 12/2012 | Mushano | |
| 2013/0198499 A1 | 8/2013 | Dice et al. | |
| 2014/0181475 A1 | 6/2014 | Abdallah | |
| 2014/0281412 A1 | 9/2014 | Abdallah | |
| 2014/0372736 A1 | 12/2014 | Greenhalgh | |
| 2015/0067662 A1 | 3/2015 | Palalau | |
| 2015/0074309 A1 | 3/2015 | Mckenney et al. | |
| 2015/0100757 A1 | 4/2015 | Burger et al. | |
| 2015/0127928 A1 | 5/2015 | Burger et al. | |
| 2015/0199199 A1 | 7/2015 | Burger et al. | |
| 2016/0378479 A1* | 12/2016 | Burger | G06F 9/3836 712/16 |
| 2016/0378499 A1 | 12/2016 | Burger et al. | |
| 2016/0378541 A1* | 12/2016 | Busaba | G06F 3/0622 711/130 |
| 2017/0075692 A1 | 3/2017 | Reddy et al. | |
| 2017/0083320 A1* | 3/2017 | Burger | G06F 9/30032 |
| 2017/0083325 A1* | 3/2017 | Burger | G06F 9/3824 |
| 2017/0083328 A1* | 3/2017 | Burger | G06F 9/30021 |
| 2017/0083329 A1* | 3/2017 | Burger | G06F 9/30098 |
| 2017/0083330 A1* | 3/2017 | Burger | G06F 9/30076 |
| 2017/0083334 A1 | 3/2017 | Burger et al. | |
| 2017/0083431 A1 | 3/2017 | Burger et al. | |
| 2017/0090939 A1 | 3/2017 | Gschwind | |
| 2017/0185408 A1 | 6/2017 | Wright | |
| 2018/0267807 A1 | 9/2018 | Burger et al. | |

FOREIGN PATENT DOCUMENTS

| | | |
|---|---|---|
| WO | 2016210031 A1 | 12/2016 |
| WO | WO 2016/210025 | 12/2016 |
| WO | 2017116652 A1 | 7/2017 |

OTHER PUBLICATIONS

Burger et al., "Design and Implementation of the TRIPS EDGE Architecture", In Proceedings of the 32nd Annual International Symposium on Computer Architecture, Jun. 4, 2005, pp. 1-41.

Burger et al., "Scaling to the End of Silicon with Edge Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Systems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

"Explicit Data Graph Execution", Retrieved on: Aug. 6, 2015, Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray, "GRVI Phalanx: A Massively Parallel RISC-V FPGA Accelerator Accelerator," 24th IEEE Symposium on Field-Programmable Custom Computing Machines (FCCM 2016), May 1, 2016, 4 pages.

Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines May 11-13, 2014, Boston, Massachusetts (poster on display for approximately 1-2 hours, and less than one day, May 2014).

Gulati et al., "Multitasking Workload Scheduling on Flexible Core Chip Multiprocessors," In Proceedings of the Computer Architecture News, vol. 36, Issue 2, May 2008, 10 pages.

(56) References Cited

OTHER PUBLICATIONS

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Huang et al., "Compiler-Assisted Sub-Block Reuse," Retrieved on: Apr. 9, 2015; Available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May, 2000, 125 pages.
International Search Report and Written Opinion Issued in PCT Application No. PCT/US18/022117, dated Jun. 20, 2018, 14 pages.
Ipek et al., "Core Fusion: Accommodating Software Diversity in Chip Multiprocessors", In Proceedings of the 34th annual international symposium on Computer architecture, Jun. 9, 2007, 12 pages.
Jain et al., "DeCO: A DSP Block Based FPGA Accelerator Overlay with Low Overhead Interconnect," 24th IEEE Symposium on Field-Programmable Custom Computing Machines (FCCM 2016), May 1, 2016, 8 pages.
Kavi, et al., "Concurrency, Synchronization, Speculation—the Dataflow Way", In Journal of Advances in Computers, vol. 96, Nov. 23, 2013, pp. 1-41.
Keckler et al., "Tera-Op Reliable Intelligently Adaptive Processing System (Trips)," In AFRL-IF-WP-TR-2004-1514, document dated Apr. 2004, 29 pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kozumplik, et al., "TRIPS to the Semantic EDGE", Retrieved on: Sep. 22, 2015, Available at: http://vbn.aau.dk/ws/files/61072300/1212050422.pdf.
Li, "Bidirectional Sequential decoding", In Doctoral Dissertation, Jun. 1994, 173 pages.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Li et al., "Compiler-assisted Hybrid Operand Communication", In TechReport TR-09-33, Nov. 2009, 12 pages.
Liu, "Hardware Techniques to Improve Cache Efficiency", In Dissertation of the University of Texas at Austin, May 2009, 189 pages.
Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
Manna et al., "DAWN: A Novel Strategy for Detecting ASCII Worms in Networks", In Proceedings of 27th IEEE International Conference on Computer Communications, Apr. 13, 2008, pp. 1-9.
Manohar, et al., "Precise Exceptions in Asynchronous Processors," In Proceedings of the 19th Conference on Advanced Research in VLSI, Mar. 14, 2001, 13 pages.
McDonald et al., "Characterization of TCC on Chip-Multiprocessors," Parallel Architectures and Compilation Techniques, 2005. PACT 2005. 14th International Conference on. IEEE, 2005, 12 pages.
McDonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Munshi, et al., "A Parameterizable SIMD Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
"P6 Microarchitecture Tuning Guide", Published on: Jan. 3, 2013; Available at: http://people.cs.clemson.edu/~mark/330/colwell/p6_tuning.pdf.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pengfei et al., "M5 Based EDGE Architecture Modeling", In Proceedings of IEEE International Conference on Computer Design, Oct. 3, 2010, pp. 289-296.
Pierce et al., "Wrong-Path Instruction Prefetching", In Proceedings of the 29th Annual IEEE/ACM International Symposium on Microarchitecture, Dec. 2, 1996, pp. 1-17.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Roesner, "Counting Dependence Predictors," In Undergraduate Honors Thesis, May 2, 2008, 25 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous Trips Architecture," In Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.

(56) References Cited

OTHER PUBLICATIONS

Smith et al., "Compiling for EDGE Architectures," In Proceedings of International Symposium on Code Generation and Optimization, Mar. 26, 2006, 11 pages.

Smith et al., "Dataflow Predication", In Proceedings of 39th Annual IEEE/ACM International Symposium on Microarchitecture, Dec. 9, 2006, 12 pages.

Smith, "Explicit Data Graph Compilation," In Thesis, Dec. 2009, 201 pages.

Smith et al., "Implementing Precise Interrupts in Pipelined Processors," *IEEE Transactions on Computers*, vol. 37, Issue 5, May 1988, pp. 562-573.

Smith et al., "Implementation of Precise Interrupts in Pipelined Processors," from the companion CD-ROM to the IEEE CS Press book The Anatomy of a Microprocessor: A Systems Perspective, by Shriver & Smith, 1998, pp. 1-15.

Smith, "TRIPS Application Binary Interface (Abi) Manual," Technical Report TR-05-22, Department of Computer Sciences, The University of Texas at Austin, Technical Report TR-05-22, document marked Oct. 10, 2006, 16 pages.

Souza et al., "Dynamically Scheduling VLIW Instructions", In Journal of Parallel and Distributed Computing, vol. 60, Jul. 2000, pp. 1480-1511.

Tamches et al., "Dynamic Kernel Code Optimization," In Workshop on Binary Translation, 2001, 10 pages.

Wong et al., "High Performance Instruction Scheduling Circuits for Out-of-Order Soft Processors," "24th IEEE Symposium on Field-Programmable Custom Computing Machines (FCCM 2016), May 1, 2016, 8 pages."

Wu et al., "Block Based Fetch Engine for Superscalar Processors", In Proceedings of the 15th International Conference on Computer Applications in Industry and Engineering, Nov. 7, 2002, 4 pages.

Zmily, "Block-Aware Instruction Set Architecture", In Doctoral Dissertation, Jun. 2007, 176 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

"Final Office Action Issued in U.S. Appl. No. 15/595,582", dated Oct. 7, 2019, 9 Pages.

Lev, et al., "Split Hardware Transactions True Nesting of Transactions using Best-Effort Hardware Transactional Memory", In Proceedings of the 13th ACM SIGPLAN Symposium on Principles and Practice of Parallel Programming, Feb. 20, 2008, pp. 197-206.

"Non Final Office Action in U.S. Appl. No. 15/595,582", dated Jan. 30, 2019, 7 Pages.

"International Search Report and Written Opinion Issued in PCT Application No. PCT/US19/39596", dated Sep. 27, 2019, 34 Pages.

\* cited by examiner

FIG. 5
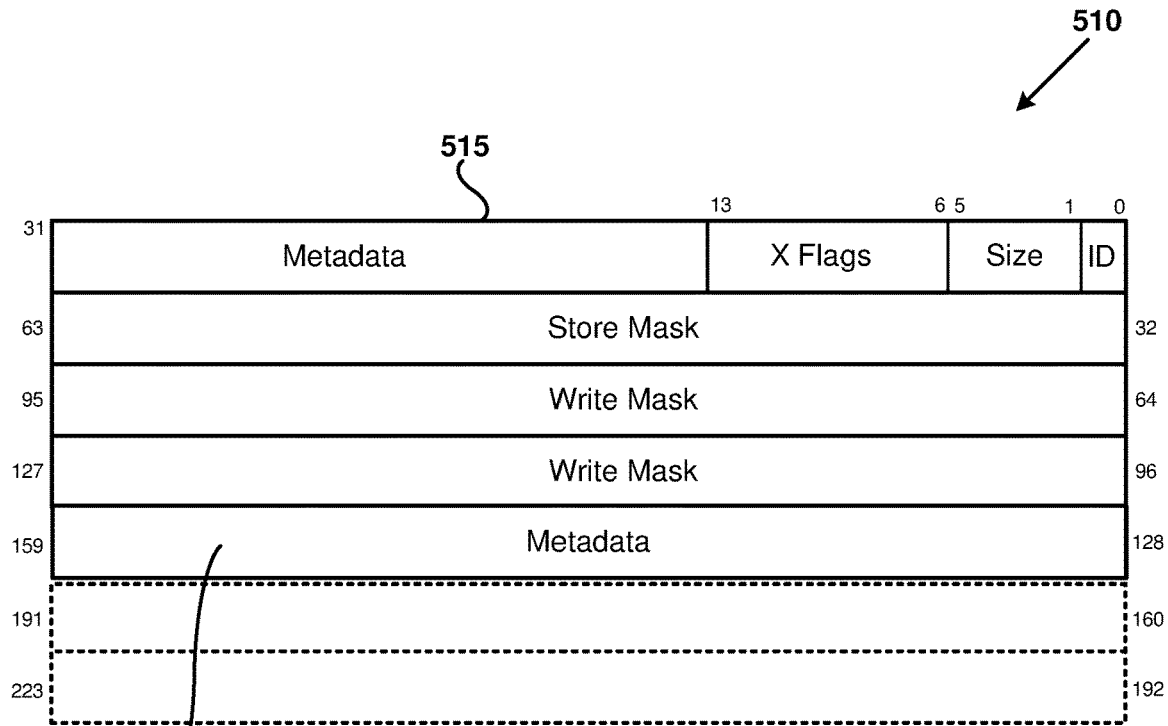
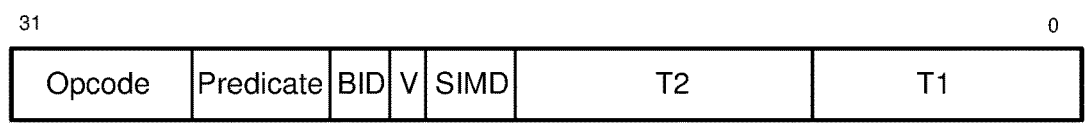
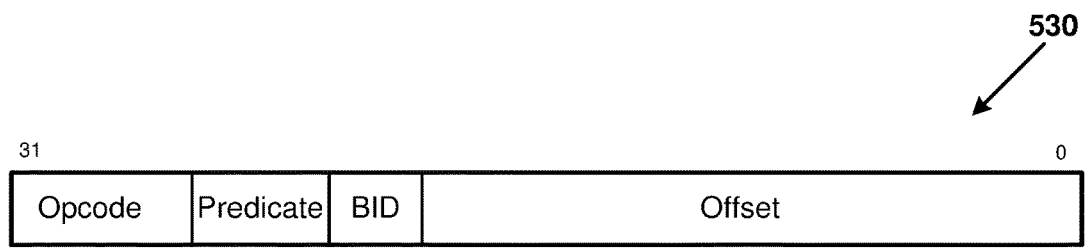
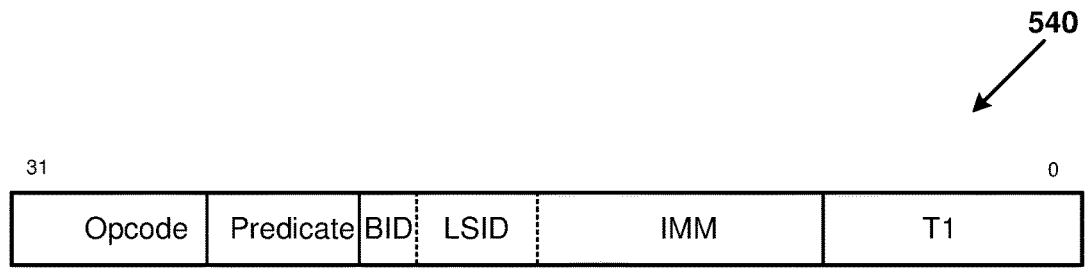

| IID | Instruction | Target(s) | Comment |
|---|---|---|---|
| I[0] | read R0 | T[2L], T[100L] | // read address for load from R0 |
| I[1] | read R3 | T[3L], T[100R] | // read R3 for decrement by I[3] |
| I[2] | loadw | T[11R] | // Long latency load from memory and send to I[11] |
| I[3] | sub #1 | R3, T[7L] | // subtract 1 and store result to GPR R3, send to I[7] |
| I[4] | read R1 | T[9L], T[11L] | // read address for stores from R1 |
| I[5] | read R5 | T[8L] | // read R5 for add by I[8] |
| I[6] | read R6 | T[10L] | // read R6 for add by I[10] |
| I[7] | teq #0 | T[8P], T[10P] | // Compute predicate by comparing R3-1 to 0, send to add instructions 8, 11 |
| I[8] | add_t #8 | T[9R] | // if predicate is true, ADD R5+8 send result to instruction 9 |
| I[9] | storew | | // Store input from I[8] to memory |
| I[10] | add_f #16 | T[11R] | // If predicate is false add R6+16 and send result to I[11] |
| I[11] | storew | | // Store input from I[10] to memory |
| . . . | | | |
| I[100] | add | T[101L] | // R0 + R3 |
| I[101] | write | R12 | // R12 <- R0+R3 |
| . . . | | | |

CFR
721

| IID | Instruction | | Target(s) | RDY | ISS | EXC | CMT | DFN |
|---|---|---|---|---|---|---|---|---|
| I[0] | read | R0 | T[2L], T[100L] | 0 | 0 | 0 | 0 | 0 |
| I[1] | read | R3 | T[3L], T[100R] | 0 | 0 | 0 | 0 | 0 |
| I[2] | loadw | | T[11R] | 0 | 0 | 0 | 0 | 0 |
| I[3] | sub | #1 | R3, T[7L] | 0 | 0 | 0 | 0 | 0 |
| I[4] | read | R1 | T[9L], T[11L] | 0 | 0 | 0 | 0 | 0 |
| I[5] | read | R5 | T[8L] | 0 | 0 | 0 | 0 | 0 |
| I[6] | read | R6 | T[10L] | 0 | 0 | 0 | 0 | 0 |
| I[7] | teq | #0 | T[8P], T[10P] | 0 | 0 | 0 | 0 | 0 |
| I[8] | add_t | #8 | T[9R] | 0 | 0 | 0 | 0 | 0 |
| I[9] | storew | | | 0 | 0 | 0 | 0 | 0 |
| I[10] | add_f | #16 | T[11R] | 0 | 0 | 0 | 0 | 0 |
| I[11] | storew | | | 0 | 0 | 0 | 0 | 0 |
| . . . | | | | 0 | 0 | 0 | 0 | 0 |
| I[100] | add | | T[101L] | 0 | 0 | 0 | 0 | 0 |
| I[101] | write | | R12 | 0 | 0 | 0 | 0 | 0 |
| . . . | | | | ~ | ~ | ~ | ~ | ~ |

| IID | Instruction | | Target(s) | RDY | ISS | EXC | CMT | DFN |
|---|---|---|---|---|---|---|---|---|
| I[0] | read | R0 | T[2L], T[100L] | 1 | 1 | 1 | 1 | 0 |
| I[1] | read | R3 | T[3L], T[100R] | 1 | 1 | 1 | 1 | 0 |
| I[2] | loadw | | T[11R] | 1 | 1 | 0 | 0 | 0 |
| I[3] | sub | #1 | R3, T[7L] | 1 | 1 | 1 | 0 | 0 |
| I[4] | read | R1 | T[9L], T[11L] | 1 | 1 | 1 | 0 | 0 |
| I[5] | read | R5 | T[8L] | 1 | 1 | 1 | 0 | 0 |
| I[6] | read | R6 | T[10L] | 1 | 1 | 1 | 0 | 0 |
| I[7] | teq | #0 | T[8P], T[10P] | 1 | 1 | 1 | 0 | 0 |
| I[8] | add_t | #8 | T[9R] | 1 | 0 | 0 | 0 | 0 |
| I[9] | storew | | | 0 | 0 | 0 | 0 | 0 |
| I[10] | add_f | #16 | T[11R] | 0 | 0 | 0 | 0 | 0 |
| I[11] | storew | | | 0 | 0 | 0 | 0 | 0 |
| . . . | | | | ~ | ~ | ~ | ~ | ~ |
| I[100] | add | | T[101L] | 1 | 1 | 1 | 0 | 0 |
| I[101] | write | | R12 | 1 | 0 | 0 | 0 | 0 |
| . . . | | | | ~ | ~ | ~ | ~ | ~ |

920

CFR 721

| IID | Instruction | Target(s) | RDY | ISS | EXC | CMT | DFN |
|---|---|---|---|---|---|---|---|
| I[0] | read R0 | T[2L], T[100L] | 1 | 1 | 1 | 1 | 0 |
| I[1] | read R3 | T[3L], T[100R] | 1 | 1 | 1 | 1 | 0 |
| I[2] | loadw | T[11R] | 1 | 1 | 0 | 1 | 1 |
| I[3] | sub #1 | R3, T[7L] | 1 | 1 | 1 | 1 | 0 |
| I[4] | read R1 | T[9L], T[11L] | 1 | 1 | 1 | 1 | 0 |
| I[5] | read R5 | T[8L] | 1 | 1 | 1 | 1 | 0 |
| I[6] | read R6 | T[10L] | 1 | 1 | 1 | 1 | 0 |
| I[7] | teq #0 | T[8P], T[10P] | 1 | 1 | 1 | 1 | 0 |
| I[8] | add_t #8 | T[9R] | 1 | 1 | 1 | 0 | 0 |
| I[9] | storew | | 1 | 1 | 0 | 0 | 0 |
| I[10] | add_f #16 | T[11R] | 0 | 0 | 0 | 1 | 1 |
| I[11] | storew | | 0 | 0 | 0 | 1 | 1 |
| ... | | | - | - | - | - | - |
| I[100] | add | T[101L] | 1 | 1 | 1 | 0 | 0 |
| I[101] | write | R12 | 1 | 1 | 1 | 0 | 0 |
| ... | | | - | - | - | - | - |

CFR 721

| IID | Instruction | | Target(s) | RDY | ISS | EXC | CMT | DFN |
|---|---|---|---|---|---|---|---|---|
| I[0] | read | R0 | T[2L], T[100L] | 1 | 1 | 1 | 1 | 0 |
| I[1] | read | R3 | T[3L], T[100R] | 1 | 1 | 1 | 1 | 0 |
| I[2] | loadw | | T[11R] | 1 | 1 | 0 | 1 | 1 |
| I[3] | sub | #1 | R3, T[7L] | 1 | 1 | 1 | 1 | 0 |
| I[4] | read | R1 | T[9L], T[11L] | 1 | 1 | 1 | 1 | 0 |
| I[5] | read | R5 | T[8L] | 1 | 1 | 1 | 1 | 0 |
| I[6] | read | R6 | T[10L] | 1 | 1 | 1 | 1 | 0 |
| I[7] | teq | #0 | T[8P], T[10P] | 1 | 1 | 1 | 1 | 0 |
| I[8] | add_t | #8 | T[9R] | 1 | 1 | 1 | 0 | 0 |
| I[9] | storew | | | 1 | 1 | 1 | 0 | 0 |
| I[10] | add_f | #16 | T[11R] | 0 | 0 | 0 | 1 | 1 |
| I[11] | storew | | | 0 | 0 | 0 | 1 | 1 |
| ... | | | | - | - | - | - | - |
| I[100] | add | | T[101L] | 1 | 1 | 1 | 0 | 0 |
| I[101] | write | | R12 | 1 | 1 | 1 | 0 | 0 |
| ... | | | | - | - | - | - | - |

CFR
721

| IID | Instruction | | Target(s) | RDY | ISS | EXC | CMT | DFN |
|---|---|---|---|---|---|---|---|---|
| I[0] | read | R0 | T[9L], T[100L] | 1 | 1 | 1 | 1 | 0 |
| I[1] | read | R3 | T[2L], T[100R] | 1 | 1 | 1 | 1 | 0 |
| I[2] | sub | #1 | R3, T[6L] | 1 | 1 | 1 | 0 | 0 |
| I[3] | read | R1 | T[8L], T[11L] | 1 | 1 | 1 | 1 | 0 |
| I[4] | read | R5 | T[7L] | 1 | 1 | 1 | 1 | 0 |
| I[5] | read | R6 | T[10L] | 1 | 1 | 1 | 1 | 0 |
| I[6] | teq | #0 | T[7P], T[10P] | 1 | 1 | 1 | 0 | 0 |
| I[7] | add_t | #8 | T[8R] | 1 | 0 | 0 | 0 | 0 |
| I[8] | storew | | | 0 | 0 | 0 | 0 | 0 |
| I[9] | loadw | | T[11R] | 1 | 1 | 0 | 0 | 0 |
| I[10] | add_f | #16 | T[11R] | 0 | 0 | 0 | 0 | 0 |
| I[11] | storew | | | 0 | 0 | 0 | 0 | 0 |
| . . . | | | | .. | .. | .. | .. | .. |
| I[100] | add | | T[101L] | 1 | 1 | 1 | 0 | 0 |
| I[101] | write | | R12 | 1 | 0 | 0 | 0 | 0 |
| . . . | | | | .. | .. | .. | .. | .. |

| IID | Instruction | Target(s) | Comment |
|---|---|---|---|
| I[0] | read R0 | T[2L], T[100L] | // read address for load from R0 |
| I[1] | read R3 | T[3L], T[100R] | // read R3 for decrement by I[3] |
| I[2] | loadw | T[11R] | // Long latency load from memory and send to I[11] |
| I[3] | sub #1 | R3, T[7L] | // subtract 1 and store result to GPR R3, send to I[7] |
| I[4] | read R1 | T[9L], T[11L] | // read address for stores from R1 |
| I[5] | read R5 | T[8L] | // read R5 for add by I[8] |
| I[6] | read R6 | T[10L] | // read R6 for add by I[10] |
| I[7] | teq #0 | T[8P], T[9P], T[10P], T[11P] | // Compute predicate by comparing R3-1 to 0, send to add instructions 8, 11 |
| I[8] | add_t #8 | T[9R] | // if predicate is true, ADD R5+8 send result to instruction 9 |
| I[9] | storew_t | | // Store input from I[8] to memory |
| I[10] | add_f #16 | T[11R] | // If predicate is false add R6+16 and send result to I[11] |
| I[11] | storew_f | | // Store input from I[10] to memory |
| ... | | | |
| I[100] | add | T[101L] | // R0 + R3 |
| I[101] | write | R12 | // R12 <- R0+R3 |
| ... | | | |

| IID | Instruction | Target(s) | Comment |
|---|---|---|---|
| I[0] | read R0 | T[2L], T[100L] | // read address for load from R0 |
| I[1] | read R3 | T[3L], T[100R] | // read R3 for decrement by I[3] |
| I[2] | loadw | T[11R] | // Long latency load from memory and send to I[11] |
| I[3] | sub #1 | R3, T[7L] | // subtract 1 and store result to GPR R3, send to I[7] |
| I[4] | read R1 | T[9L], T[11L] | // read address for stores from R1 |
| I[5] | read R5 | T[8L] | // read R5 for add by I[8] |
| I[6] | read R6 | T[10L] | // read R6 for add by I[10] |
| I[7] | teq #0 | T[8P], T[10P], T[11P] | // Compute predicate by comparing R3-1 to 0, send to add instructions 8, 11 |
| I[8] | add_t #8 | T[9R] | // if predicate is true, ADD R5+8 send result to instruction 9 |
| I[9] | storew | | // Store input from I[8] to memory |
| I[10] | add_f #16 | T[12R] | // If predicate is false add R6+16 and send result to I[12] |
| I[11] | null_f | T[12P] | // send null instruction to store |
| I[12] | storew | | // Store input from I[10] to memory |
| . . . | | | |
| I[100] | add | T[101L] | // R0 + R3 |
| I[101] | write | R12 | // R12 <- R0+R3 |
| . . . | | | |

FIG. 13
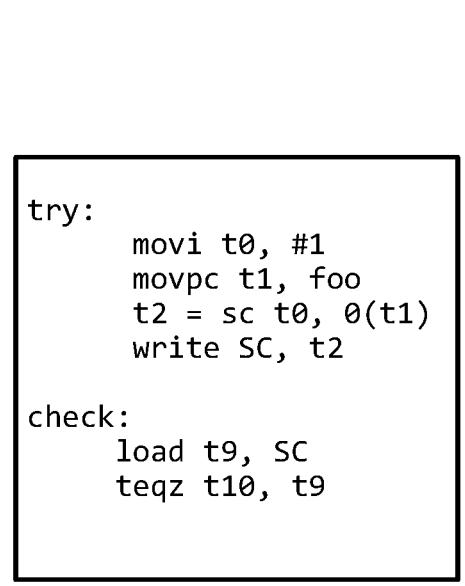
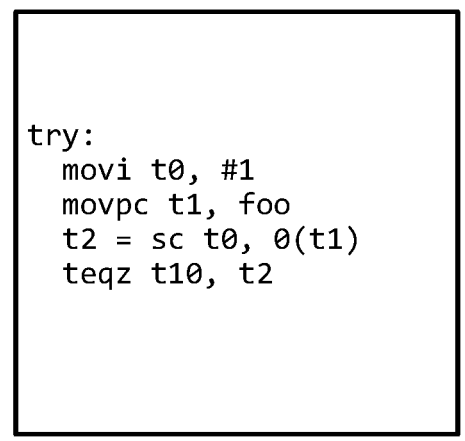

FIG. 14

| Data Type | Bits | Save Area Contents | Memory address DIR = 0 |
|---|---|---|---|
| Target PC-, instruction predicates-, GPR Write Map-, and Broadcast-valid bitmap | [31:30]<br>[29]<br>[28]<br>[27:12]<br>[11]<br>[10]<br>[9]<br>[8]<br>[7]<br>[6]<br>[5]<br>[4]<br>[3]<br>[2]<br>[1]<br>[0] | 00,<br>Target PC valid (TPV),<br>Instruction Predicates field valid (IPV),<br>GPR15, GPR14,…,GPR1, GPR0,<br>BC3 op1_valid,<br>BC2 op1 valid,<br>BC1 op1 valid,<br>BC3 op0_valid,<br>BC2 op0 valid,<br>BC1 op0 valid,<br>BC3 predicate valid,<br>BC3 predicate,<br>BC2 predicate valid,<br>BC2 predicate,<br>BC1 predicate valid,<br>BC1 predicate | EXC_SAP |
| Target PC | [31:0] | (Included only if TPV = 1) | EXC_SAP+4 |
| Instruction Predicates | [31:0] | (Included only if IPV = 1)<br><br>{predicate valid [15], predicate [15], …, predicate valid [0], predicate [0]} | EXC_SAP+8 |
| Broadcasts | [31:0] | Valid broadcasts in the order:<br>BC3 op1 BC2 op1 BC1 op1<br>BC3 op0 BC2 op0 BC1 op0 | EXC_SAP+12 To EXC_SAP+M |
| Operand Buffer Valid Map | [31:0] | {operand1 valids [15:0], operand0 valids [15:0]} | EXC_SAP+M |
| Operand1s | [31:0] | Valid operand1s starting from slot 0 | .. |
| | | .. | .. |
| Operand0s | [31:0] | Valid operand0s starting from slot 0 | EXC_SAP+N |
| | | … | EXC_SAP+N |

COMMIT LOGIC AND PRECISE EXCEPTIONS IN EXPLICIT DATAFLOW GRAPH EXECUTION ARCHITECTURES

CROSS-REFERENCE TO RELATED APPLICATIONS

This application claims the benefit of U.S. Provisional Application No. 62/733,585, entitled "COMMIT LOGIC AND PRECISE EXCEPTIONS IN EXPLICIT DATAFLOW GRAPH EXECUTION ARCHITECTURES," filed Sep. 19, 2018, which application is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Apparatus and methods are disclosed for scheduling and committing instruction blocks, as well as handling exception events such as software exceptions and hardware interrupts, in block-based and Explicit Data Graph Execution (EDGE) processor architectures. As such processors can use relatively large blocks of instructions, the disclosed technology can be used to handle such exceptions, avoiding undo delay, while providing a suitable debugging environment for restoring processor state after handling such exceptions. According to certain examples of the disclosed technology, the use of large load/store queues and other hardware can be avoided by allowing for individual instructions of an instruction block to commit (by writing the instruction's architecturally-visible results) after execution, but prior to the entire block being committed. In some examples, the event exceptions can be handled by resuming the interrupted instruction block at the point where the event interrupted execution of the block, by resuming execution at the start of the block, or by processing the event after the block commits Thus, issues with instruction side effects can be avoided by, for example, preventing redundant memory accesses that can cause unwanted, additional side effects.

In EDGE processors, instructions within a block can issue and execute when an individual instruction's dependencies (inputs) are available. Thus, block-based instructions within a block can issue and execute in an arbitrary order. Because instructions execute when ready, and not necessarily in sequential order, latency due to delay in receiving instruction operands can be reduced or avoided. In some examples of the disclosed technology, a block-based processor includes hardware for maintaining a commit frontier. In some examples, the commit frontier is the point at which all sequentially-preceding instructions within the commit frontier are in a state of being ready to be committed. Thus, while instructions can issue and execute in an arbitrary order, the instructions are committed in their sequential order within the block. Because individual instructions can commit, large load store queues and other structures storing state can be reduced by performing write back operations (e.g., storing register values or writing to memory) once an instruction has completed, rather than waiting for the entire block to be ready to commit, to start performing write back operations committing instructions. Instructions that do not affect architectural state (for example, instructions that have a not-taken predicate condition, instructions that send target operands to instructions that have a not-taken predicate condition, or instructions specified by the programmer that do not affect state) can be quashed, allowing the instruction block to be committed earlier. In some examples, an instruction is quashed by stopping issue and/or execution of the instruction. In some examples, an instruction is quashed by allowing the block to commit, and the instruction completes operation while the instruction block is no longer architecturally relevant.

In some examples, disclosed methods include processing exceptions and interrupts by executing a portion of instructions of a first instruction block and logging results generated by the executing portion in a memory. For example, the memory can be a load store queue, shadow registers, or context data stored on a processor stack. An exception event is received and processed by transferring control of the processor to a second instruction block. A second instruction block can process the event by, for example, invoking a debugger, or executing functions provided by the operating system. After the exception event is processed, the first instruction block can be resumed by restoring the processor state using the logged results stored in the memory, and executing the next portion of the first instruction block that does not include executed instructions for which results were logged.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Any trademarks used herein remain the property of their respective owners. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIG. 8 is an instruction block that can be executed using serial commit, as can be implemented in certain examples of the disclosed technology.

FIGS. 9A-9F are diagrams of instruction scheduler state as the instruction block of FIG. 8 is executed, as can be implemented in certain examples of the disclosed technology.

FIG. 10 is a diagram of instruction scheduler state as a reordered examples of the instruction block of FIG. 8 is executed, as can be implemented in certain examples of the disclosed technology.

FIG. 11 is a diagram of instruction scheduler state in a different implementation of the instruction block of FIG. 8, as can be implemented in certain examples of the disclosed technology.

FIG. 12 is a diagram of instruction scheduler state in a different implementation of the instruction block of FIG. 8, as can be implemented in certain examples of the disclosed technology.

FIG. 13 is a diagram illustrating use of a store conditional instruction in a block-based processor using serial commit.

FIG. 14 is a diagram illustrating a suitable format for storing state including transient state, as can be used in certain examples of exception handling disclosed herein.

DETAILED DESCRIPTION

I. General Considerations

Figure 1:
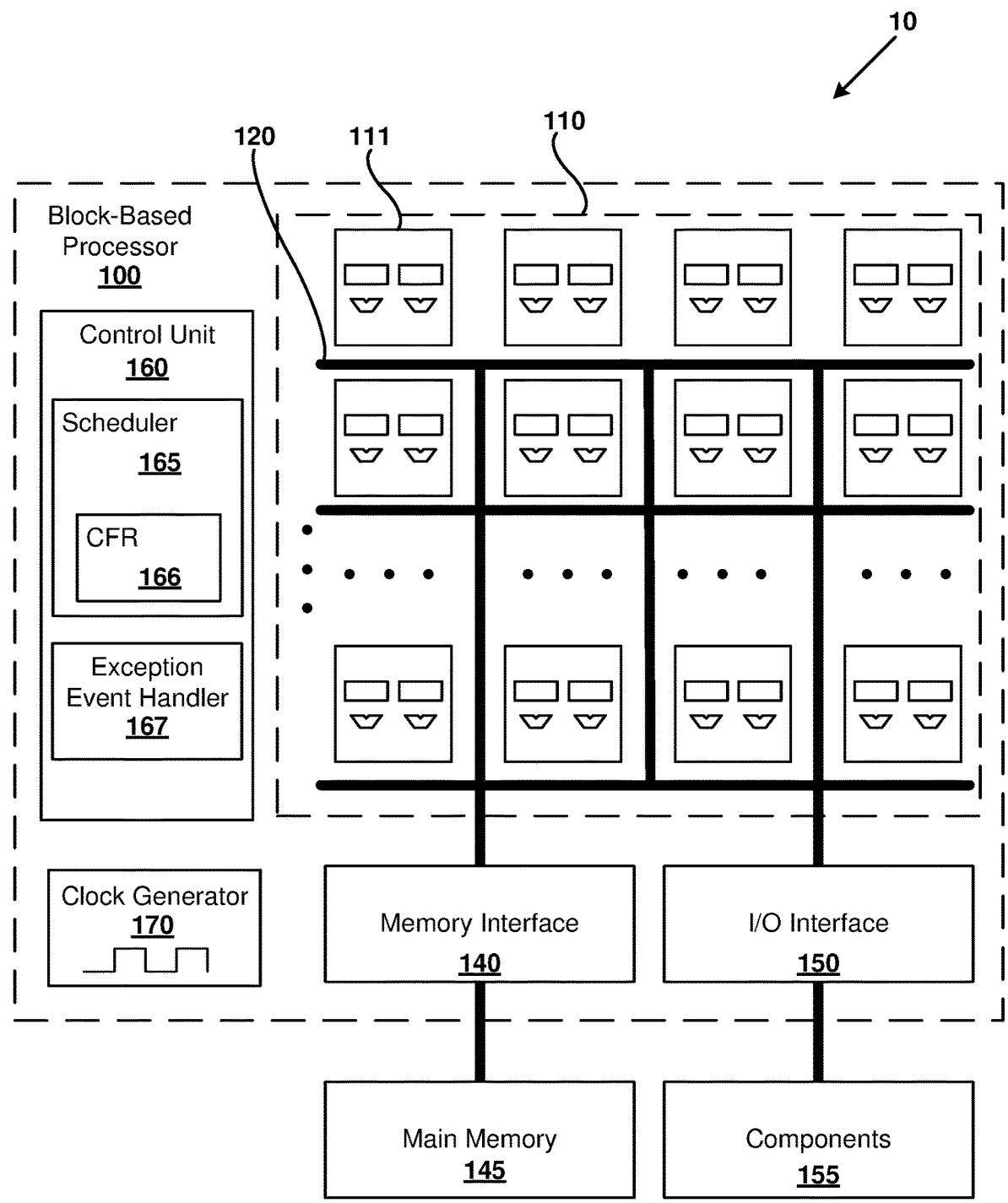
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (including random-access memory, such as dynamic RAM (DRAM), static RAM (SRAM), or embedded DRAM (eDRAM), or non-random access memories, such as certain configurations of registers, buffers, or queues), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented with software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an instruction block. Block-based instructions can be used to express semantics of program data flow and/or instruction flow in a more explicit fashion, allowing for improved compiler and processor performance. In certain examples of the disclosed technology, an EDGE ISA includes information about program control flow that can be used to improve detection of improper control flow instructions, thereby increasing performance, saving memory resources, and/or and saving energy.

In some examples of the disclosed technology, intermediate results produced by the instructions within an instruction block are buffered locally until the individual instruction is committed. The instruction block can be committed once all of its instructions have either committed or been marked as defunct. Defunct instructions can be quashed because they do not affect architecturally-visible state. When the instruction is committed, updates to the visible architectural state resulting from executing the instructions of the instruction block are made visible to other instruction blocks. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

According to one aspect of the disclosed technology, a processor executes an instruction block by executing instructions having their dependencies ready in any order, but serially committing individual instructions within the instruction block in program order. In other words, individual instructions are committed the order in which the instructions appear within the block. In some examples, the processor uses a commit frontier register to indicate which instructions within the instruction block can be committed.

According to a second aspect of the disclosed technology, a processor resumes program execution after handling exceptions by logging intermediate execution results generated by an instruction block, branching to a second instruction block in order to service the exception, and resuming execution of the interrupted instruction block by restoring the logged intermediate execution results and resuming execution with the next unexecuted instruction. By allowing individual instructions to commit as processing of an instruction block continues, this allows the programmer to have access to all committed program results in the exception handler. This enables the use of more traditional debugging techniques and can preclude the need to separately buffer results generated by instructions during execution.

As used herein, an instruction block refers to a group of instructions that shares transient state. Transient state includes operands that are transmitted between instructions, without using a register or other architecturally-visible state. This transient state is not shared or otherwise visible to the programmer when leaving the block.

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute blocks of instructions according to an instruction set architecture (ISA), which describes a number of aspects of processor operation, including a register model, a number of defined operations performed by block-based instructions, a memory model, exception models, and other architectural features. The block-based processor includes a plurality of one or more processing cores 110, including a processor core 111. The block-based processor can be implemented in as a custom or application-specific integrated circuit (e.g., including a system-on-chip (SoC) integrated circuit), as a field programmable gate array (FPGA) or other reconfigurable logic, or as a soft processor virtual machine hosted by a physical general purpose processor.

As shown in FIG. 1, the processor cores are connected to each other via core interconnect 120. The core interconnect 120 carries data and control signals between individual ones of the cores 110, a memory interface 140, and an input/output (I/O) interface 150. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to memory 145, for example, memory located on another integrated circuit besides the processor 100 (e.g., the memory can be static RAM (SRAM) or dynamic RAM (DRAM)), or memory embedded on the same integrated circuit as the processor (e.g., embedded SRAM or DRAM (eDRAM)). The memory interface 140 and/or the main memory can include caches (e.g., n-way or associative caches) to improve memory access performance. In some examples the cache is implemented using static RAM (SRAM) and the main memory 145 is implemented using dynamic RAM (DRAM). In some examples the memory interface 140 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 manages allocation of virtual memory, expanding the available main memory 145. In some examples, support for bypassing cache structures or for ensuring cache coherency when performing memory synchronization operations (e.g., handling contention issues or shared memory between plural different threads, processes, or processors) are provided by the memory interface 140 and/or respective cache structures.

The memory interface 140 can also include a translation lookaside buffer (TLB), which caches mappings of virtual memory addresses to physical memory addresses. The TLB can raise a signal when a requested virtual memory address is not currently cached in the TLB, thereby raising an exception.

The I/O interface 150 includes circuitry for receiving and sending input and output signals to other components 155, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals can be synchronous or asynchronous. In some examples, all or a portion of the I/O interface is implemented using memory-mapped I/O techniques in conjunction with the memory interface 140. In some examples the I/O signal implementation is not limited to full swing electrical digital signals, but the I/O interface 150 can be configured to provide differential signals, pulsed signals, or other suitable signals for transmitting data and control signals.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 150, modification of execution flow, and verifying target location(s) of branch instructions, instruction headers, and other changes in control flow. The control unit 160 can generate and control the processor according to control flow and metadata information representing exit points and control flow probabilities for instruction blocks. The control unit can be used to control data flow between general-purpose portions of the processor cores 110.

The control unit 160 can also process hardware interrupts, and control reading and writing of special system registers, for example a program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory, a hard macro processor block provided in an FPGA, or a general purpose soft processor). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 used to control instruction pipelines of the processor cores 110. In other examples, schedulers can be arranged so that they are contained with each individual processor core. As used herein, scheduler block allocation refers to directing operation of an instruction blocks, including initiating instruction block mapping, fetching, decoding, execution, committing, aborting, idling, and refreshing an instruction block. Further, instruction scheduling refers to scheduling the issuance and execution of instructions within an instruction block. For example, based on instruction dependencies and data indicating a relative ordering for memory access instructions, the control unit 160 can determine which instruction(s) in an instruction block are ready to issue and initiate issuance and execution of the instructions. Processor cores 110 are assigned to instruction blocks during instruction block mapping. The recited stages of instruction operation are for illustrative purposes and in some examples of the disclosed technology, certain operations can be combined, omitted, separated into multiple operations, or additional operations added. The scheduler 165 schedules the flow of instructions, including allocation and de-allocation of cores for performing instruction processing, control of input data and output data between any of the cores, register files, the memory interface 140, and/or the I/O interface 150. The scheduler includes a commit frontier register (CFR) 166 that indicates the highest numbered instruction in the instruction block that can commit. For example, the CFR 166 can store a pointer to the highest numbered instruction identifier (IID) in an instruction block that can commit.

An exception event handler 167 controls processing of exception events such as software exceptions and hardware interrupts. In particular, the exception event handler 167 can be used to receive exception events, intercede in execution of an instruction block, including transferring control to an event handler, and control resuming operation by the interrupted instruction block. State data for the interrupted instruction block can be logged, and this stored data used to restore at least a portion of instruction window state when the block resumes. In some examples, the instruction block resumes at the interrupted instruction, in other examples, the block is rewound to a starting instruction and the same portion of instructions is re-executed. In some examples, processing of the exception is delayed until the instruction block commits In examples that use a commit frontier register, individual instructions within the commit frontier can be committed, which allows for less transient state to be stored before branching to an exception handler.

The block-based processor 100 also includes a clock generator 170, which distributes one or more clock signals to various components within the processor (e.g., the cores 110, interconnect 120, memory interface 140, and I/O interface 150). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
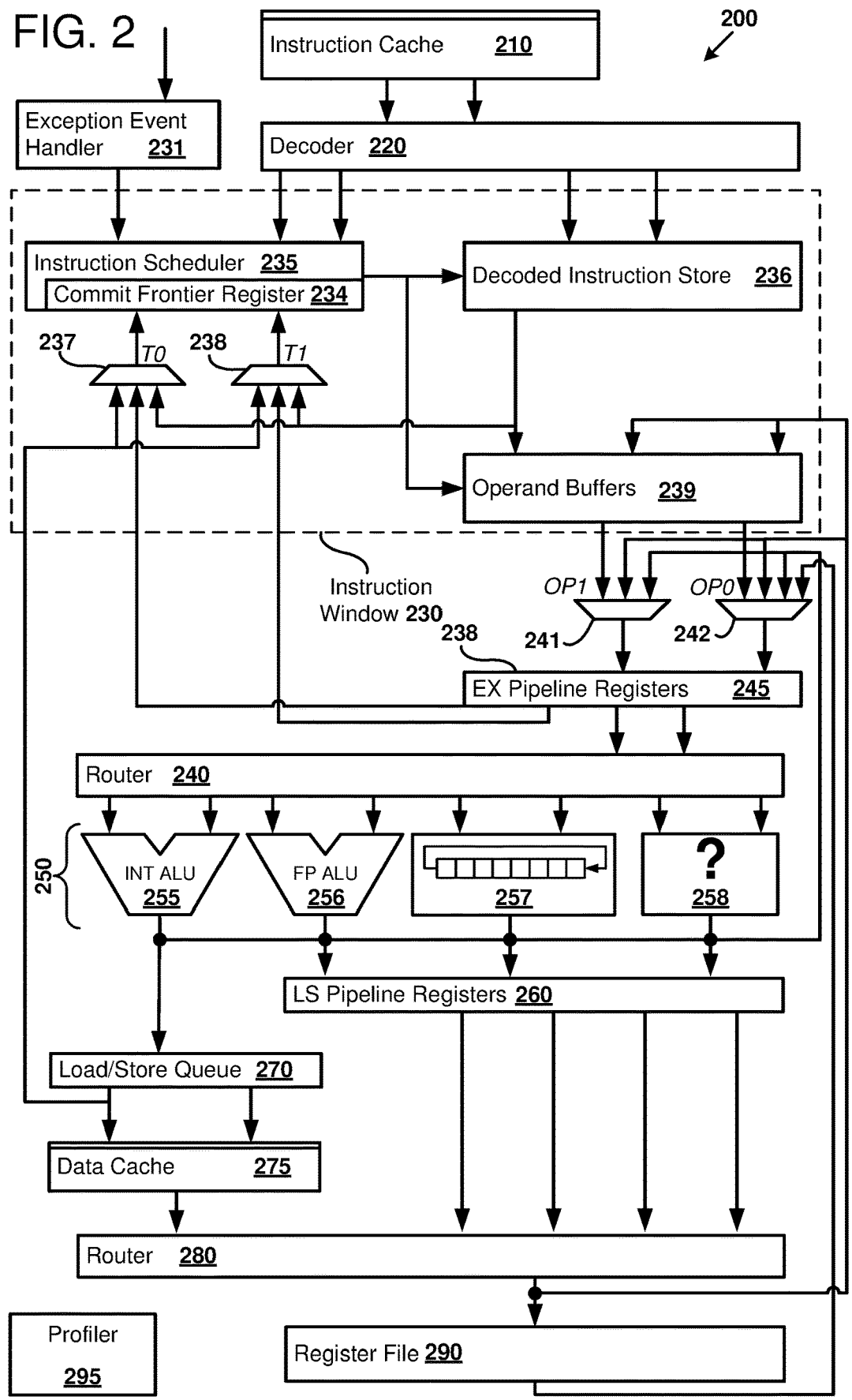
FIG. 2 illustrates a block-based processor core, as can be used in some examples of the disclosed technology.

FIG. 2 is a block diagram further detailing an example microarchitecture 200 for implementing the block-based processor 100, and in particular, an instance of one of the block-based processor cores, as can be used in certain examples of the disclosed technology. For ease of explanation, the exemplary microarchitecture has five pipeline stages including: instruction fetch (IF), decode (DC), issue, including operand fetch (IS), execute (EX), memory/data access (LS), and commit (CMT). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core includes an instruction cache 210 that is coupled to an instruction decoder 220. The instruction cache 210 is configured to receive block-based processor instructions from a memory. In some FPGA implementations, the instruction cache can be implemented by a dual read port, dual write port, 18 or 36 Kb (kilobit), 32-bit wide block RAM. In some examples, the physical block RAM is configured to operate as two or more smaller block RAMs.

The processor core further includes an instruction window 230, which includes an instruction scheduler 235 with a commit frontier register 234, a decoded instruction store 236, and a plurality of operand buffers 239. The commit frontier register 234 indicates the highest numbered instruction in the instruction block that can commit. For example, the commit frontier register 234 can store a pointer to the highest numbered instruction identifier (IID) in an instruction block that can commit.

In FPGA implementations, each of these instruction window components 230 can be implemented including the use of LUT RAM (e.g., with SRAM configured as lookup tables) or BRAM (block RAM). The instruction scheduler 235 can send an instruction identifier (instruction ID or IID) for an instruction to the decoded instruction store 236 and the operand buffers 239 as a control signal. As discussed further below, each instruction in an instruction block has an associated instruction identifier that uniquely identifies the instruction within the instruction block. In some examples, instruction targets for sending the result of executing an instruction are encoded in the instruction. In this way, dependencies between instructions can be tracked using the instruction identifier instead of monitoring register dependencies. In some examples, the processor core can include two or more instruction windows. In some examples, the processor core can include one instruction window with multiple block contexts.

An exception event handler 231 controls processing of exception events such as software exceptions and hardware interrupts. In particular, the exception event handler 231 can be used to receive exception events, intercede in execution of an instruction block, including transferring control to an event handler (e.g., implemented as a number of other instruction blocks forming part of an operating system), and control resuming operation by returning control to the interrupted instruction block. In some examples, the exception event handler 231 is configured to transfer control to an event handler, and return control to a third, different instruction block. For example, try/catch blocks can define instruction blocks where control is resumed at a third, different instruction block, as discussed further below in the example method of FIG. 13. State data for the interrupted instruction block can be logged, and this stored data used to restore at least a portion of instruction window state when the block resumes. In some examples, the instruction block resumes at the interrupted instruction, in other examples, the block is rewound to a starting instruction and the same portion of instructions is re-executed. In some examples, processing of the exception is delayed until the instruction block commits. As shown in FIG. 2, the example microarchitecture 200 has an exception event handler for each processor core. In other examples, a processor includes an exception event handler that is used by two or more processor cores (e.g., as shown with the exception event handler 167 of FIG. 1).

As will be discussed further below, the microarchitecture 200 includes a register file 290 that stores data for registers defined in the block-based processor architecture, and can have one or more read ports and one or more write ports. Because an instruction block executes on a transactional basis, changes to register values made by an instance of an instruction block are not visible to the same instance; the register writes will be committed upon completing execution of the instruction block.

The example microarchitecture 200 also includes a hardware profiler 295. The hardware profiler 295 can collect information about programs that execute on the processor. For examples, data regarding events, function calls, memory locations, and other information can be collected (e.g., using hardware instrumentation such as registers, counters, and other circuits) and analyzed to determine which portions of a program might be optimized. For example, program flow can be analyzed to determine that certain instructions should be ordered later in the instruction block to allow preceding instructions to commit earlier. For example, a memory load instruction that sends data to a predicated instruction having a low probability of being taken can be ordered lower in the instruction block so that more preceding instructions can be committed.

The decoded instruction store 236 stores decoded signals for controlling operation of hardware components in the processor pipeline. For example, a 32-bit instruction can be decoded into 128-bits of decoded instruction data. The decoded instruction data is generated by the decoder 220 after an instruction is fetched. The operand buffers 239 store operands (e.g., register values received from the register file, data received from memory, immediate operands coded within an instruction, operands calculated by an earlier-issued instruction, or other operand values) until their respective decoded instructions are ready to execute. Instruction operands and predicates for the execute phase of the pipeline are read from the operand buffers 239, respectively, not (directly, at least) from the register file 290. The instruction window 230 can include a buffer for predicates directed to an instruction, including wired-OR logic for combining predicates sent to an instruction by multiple instructions.

In some examples, all of the instruction operands, except for register read operations, are read from the operand buffers 239 instead of the register file. In some examples, the values are maintained until the instruction issues and the operand is communicated to the execution pipeline. In some FPGA examples, the decoded instruction store 236 and operand buffers 239 are implemented with a plurality of LUT RAMs.

The instruction scheduler 235 maintains a record of ready state of each decoded instruction's dependencies (e.g., the instruction's predicate and data operands). When all of the instruction's dependencies (if any) are satisfied, the instruction wakes up and is ready to issue. In some examples, the lowest numbered ready instruction ID is selected each pipeline clock cycle and its decoded instruction data and input operands are read. Besides the data mux and function unit control signals, the decoded instruction data can encode up to two ready events in the illustrated example. The instruction scheduler 235 accepts these and/or events from other sources (selected for input to the scheduler on inputs T0 and T1 with multiplexers 237 and 238, respectively) and updates the ready state of other instructions in the window. Thus dataflow execution proceeds, starting with the instruction block's ready zero-input instructions, then instructions that these instructions target, and so forth. Some instructions are ready to issue immediately (e.g., move immediate instructions) as they have no dependencies. Depending on the ISA, control structures, and other factors, the decoded instruction store 236 is about 100 bits wide in some examples, and includes information on instruction dependencies, including data indicating which target instruction(s)'s active ready state will be set as a result of issuing the instruction. The instruction scheduler 235 can store data for individual instructions indicating whether an individual instruction is ready to issue, has issued, has executed, is ready to commit, has committed, or is defunct. Examples of defunct instructions include instructions on not-taken predicated paths, instructions that send data to receiving instructions that are on a not-taken predicated paths, or malformed instructions.

As used herein, ready state refers to processor state that indicates, for a given instruction, whether and which of its operands (if any) are ready, and whether the instruction itself is now ready for issue. In some examples, ready state includes decoded ready state and active ready state. Decoded ready state data is initialized by decoding instruction(s). Active ready state represents the set of input operands of an instruction that have been evaluated so far during the execution of the current instance of an instruction block. A respective instruction's active ready state is set by executing instruction(s) which target, for example, the left, right, and/or predicate operands of the respective instruction.

Attributes of the instruction window 230 and instruction scheduler 235, such as area, clock period, and capabilities can have significant impact to the realized performance of an EDGE core and the throughput of an EDGE multiprocessor. In some examples, the front end (IF, DC) portions of the microarchitecture can run decoupled from the back end portions of the microarchitecture (IS, EX, LS, CMT). In some FPGA implementations, the instruction window 230 is configured to fetch and decode two instructions per clock into the instruction window.

The instruction scheduler 235 has diverse functionality and requirements. It can be highly concurrent. Each clock cycle, the instruction decoder 220 writes decoded ready state and decoded instruction data for one or more instructions into the instruction window 230. Each clock cycle, the instruction scheduler 235 selects the next instruction(s) to issue, and in response the back end sends ready events, for example, target ready events targeting a specific instruction's input slot (e.g., predicate slot, right operand (OP0), or left operand (OP1)), or broadcast ready events targeting all instructions waiting on a broadcast ID. These events cause per-instruction active ready state bits to be set that, together with the decoded ready state, can be used to signal that the corresponding instruction is ready to issue. The instruction scheduler 235 sometimes accepts events for target instructions which have not yet been decoded, and the scheduler can also inhibit reissue of issued ready instructions.

Control circuits (e.g., signals generated using the decoded instruction store 236) in the instruction window 230 are used to generate control signals to regulate core operation (including, e.g., control of datapath and multiplexer select signals) and to schedule the flow of instructions within the core. This can include generating and using memory access instruction encodings, allocation and de-allocation of cores for performing instruction processing, control of input data and output data between any of the cores 110, register files, the memory interface 140, and/or the I/O interface 150.

In some examples, the instruction scheduler 235 is implemented as a finite state machine coupled to the other instruction window logic. In some examples, the instruction scheduler is mapped to one or more banks of RAM in an FPGA, and can be implemented with block RAM, LUT RAM, or other reconfigurable RAM. As will be readily apparent to one of ordinary skill in the relevant art, other circuit structures, implemented in an integrated circuit, programmable logic, or other suitable logic can be used to implement hardware for the instruction scheduler 235. In some examples of the disclosed technology, front-end pipeline stages IF and DC can run decoupled from the back-end pipelines stages (IS, EX, LS, CMT).

In the example of FIG. 2, the operand buffers 239 send the data operands, which can be designated left operand (LOP) and right operand (ROP) for convenience, to a set of execution state pipeline registers 245 via one or more switches (e.g., multiplexers 241 and 242). These operands can also be referred to as OP1 and OP0, respectively. A first router 240 is used to send data from the operand buffers 239 to one or more of the functional units 250, which can include but are not limited to, integer ALUs (arithmetic logic units) (e.g., integer ALUs 255), floating point units (e.g., floating point ALU 256), shift/rotate logic (e.g., barrel shifter 257), or other suitable execution units, which can including graphics functions, physics functions, and other mathematical operations. In some examples, a programmable execution unit 258 can be reconfigured to implement a number of different arbitrary functions (e.g., a priori or at runtime).

Data from the functional units 250 can then be routed through a second router (not shown) to a set of load/store pipeline registers 260, to a load/store queue 270 (e.g., for performing memory load and memory store operations), or fed back to the execution pipeline registers, thereby bypassing the operand buffers 239. In some examples, the use of serial instruction commit allows for the load/store queue to be reduced in size and complexity, or eliminated entirely. In some examples, the use of serial instruction commit allows for store and load forwarding within the execution pipeline to be simplified or eliminated. In some examples, the use of serial instruction commit allows for the use of and encoding of load store identifiers to be eliminated. This is because the relative ordering is determined by the ordering of instructions, and so memory access hazards can be avoided by relying on the processor performing commit of instructions in the serial order in which these instructions are arranged. The load/store queue 270 is coupled to a data cache 275 that caches data for memory operations. The outputs of the data cache 275, and the load/store pipelines registers 260 can be sent to a third router 280, which in turn sends data to the register file 290, the operand buffers 239, and/or the execution pipeline registers 245, according to the instruction being executed in the pipeline stage. The use of individually-committed instructions, instead of committing instruction blocks only on a per-block basis, can be allowed for reduced resource requirements to implement load/store queues. For examples, less storage for buffering register writes and memory stores may be needed, as individual instructions can have their results saved before the entire block has committed. Further, instructions such as store conditional operations that require two blocks to implement in atomic instruction block implementations can be implemented with a single instruction block in certain serial commit implementations.

When execution of an individual instruction is complete, the instruction is designated as "committed" and signals from the control outputs can in turn be used by other cores within the block-based processor 100 and/or by the control unit 160 to initiate scheduling, fetching, and execution of other instruction blocks.

When all instructions within an individual instruction block have completed execution or been marked defunct, the instruction block as a whole is designated as "committed" and signals from the control outputs can in turn can be used by other cores within the block-based processor 100 and/or by the control unit 160 to initiate scheduling, fetching, and execution of other instruction blocks.

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window and control unit of the processor cores 110. The area, clock period, capabilities, and limitations substantially determine the realized performance of the individual cores 110 and the throughput of the block-based processor 100.

Updates to the visible architectural state of the processor (such as to the register file 290 and the memory) affected by the executed instructions can be buffered locally within the core until the instructions are committed. The control circuitry can determine when instructions are ready to be committed, sequence the commit logic, and issue a commit signal. For example, a commit phase for an instruction block can begin when all register writes are buffered, all writes to memory (including unconditional and conditional stores) are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control circuit also controls, at least in part, allocation of functional units to the instructions window.

In some examples, block-based instructions can be either non-predicated, or predicated true or false. A predicated instruction does not become ready until it is targeted by another instruction's predicate result, and that result matches the predicate condition. If the instruction's predicate does not match, then the instruction never issues. In some examples, most if not all instructions in the instruction set architecture can be predicated. This contrasts to most other CISC or RISC processors, which typically predicate only branch/jump instructions and do not allow for general instructions to have an optional predicate.

In some examples, upon branching to a new instruction block, all instruction window ready state (stored in the instruction scheduler 235) is flash cleared (block reset). However when a block branches back to itself (block refresh), only active ready state is cleared; the decoded ready state is preserved so that it is not necessary to re-fetch and decode the blocks instructions. Thus, refresh can be used to save time and energy in loops, instead of performing a block reset.

Since some software critical paths include a single chain of dependent instructions (for example, instruction A targets instruction B, which in turn targets instruction C), it is often desirable that the dataflow scheduler not add pipeline bubbles for successive back-to-back instruction wakeup. In such cases, the IS-stage ready-issue-target-ready pipeline recurrence should complete in one cycle, assuming that this does not severely affect clock frequency.

Instructions such as ADD have a latency of one cycle. With EX-stage result forwarding, the scheduler can wake their targets' instructions in the IS-stage, even before the instruction completes. Other instruction results may await ALU comparisons, take multiple cycles, or have unknown latency. These instructions wait until later to wake their targets.

Finally, the scheduler design can be scalable across a spectrum of EDGE ISAs. In some examples, each pipeline cycle can accept from one to four decoded instructions and from two to four target ready events, and issue one to two instructions per cycle.

A number of different technologies can be used to implement the exception event handler 231 and the instruction scheduler 235. For example, the scheduler 235 can be implemented as a parallel scheduler, where instructions' ready state is explicitly represented in D-type flip-flops (FFs), and in which the ready status of every instruction is reevaluated each cycle. In other examples, the instruction scheduler 235 can be implemented as a more compact incremental scheduler that keeps ready state in LUT RAM and which updates ready status of about two to four target instructions per cycle. The use of serial instruction commit can allow for the general purpose register and memory state be consistent with the excepted instruction. Thus the use of shadow registers to emulate a more traditional programmer view can be reduced or eliminated.

The register file 290 can include two or more write ports for storing data in the register file, as well as having a plurality of read ports for reading data from individual registers within the register file. In some examples, a single instruction window (e.g., instruction window 230) can access only one port of the register file at a time, while in other examples, the instruction window 230 can access one read port and one write port, or can access two or more read ports and/or write ports simultaneously. In some examples, the microarchitecture is configured such that not all the read ports of the register file 290 can use the bypass mechanism. For the example microarchitecture 200 shown in FIG. 2, the register file can send register data on the bypass path to one of the multiplexers 242 for the operand OP0, but not operand OP1. Thus, for multiple register reads in one cycle, only one operand can use the bypass, while the other register read results are sent to the operand buffers 239, which inserts an extra clock cycle in the instruction pipeline.

In some examples, the register file 290 can include 64 registers, each of the registers holds a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 290 can be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, the register file 290 is implemented as an array of flip-flops, while in other examples, the register file can be implemented using latches, SRAM, FPGA LUT RAM, FPGA block RAM, or other forms of memory storage. The ISA specification for a given processor specifies how registers within the register file 290 are defined and used.

V. Example Stream of Instruction Blocks

Figure 3:
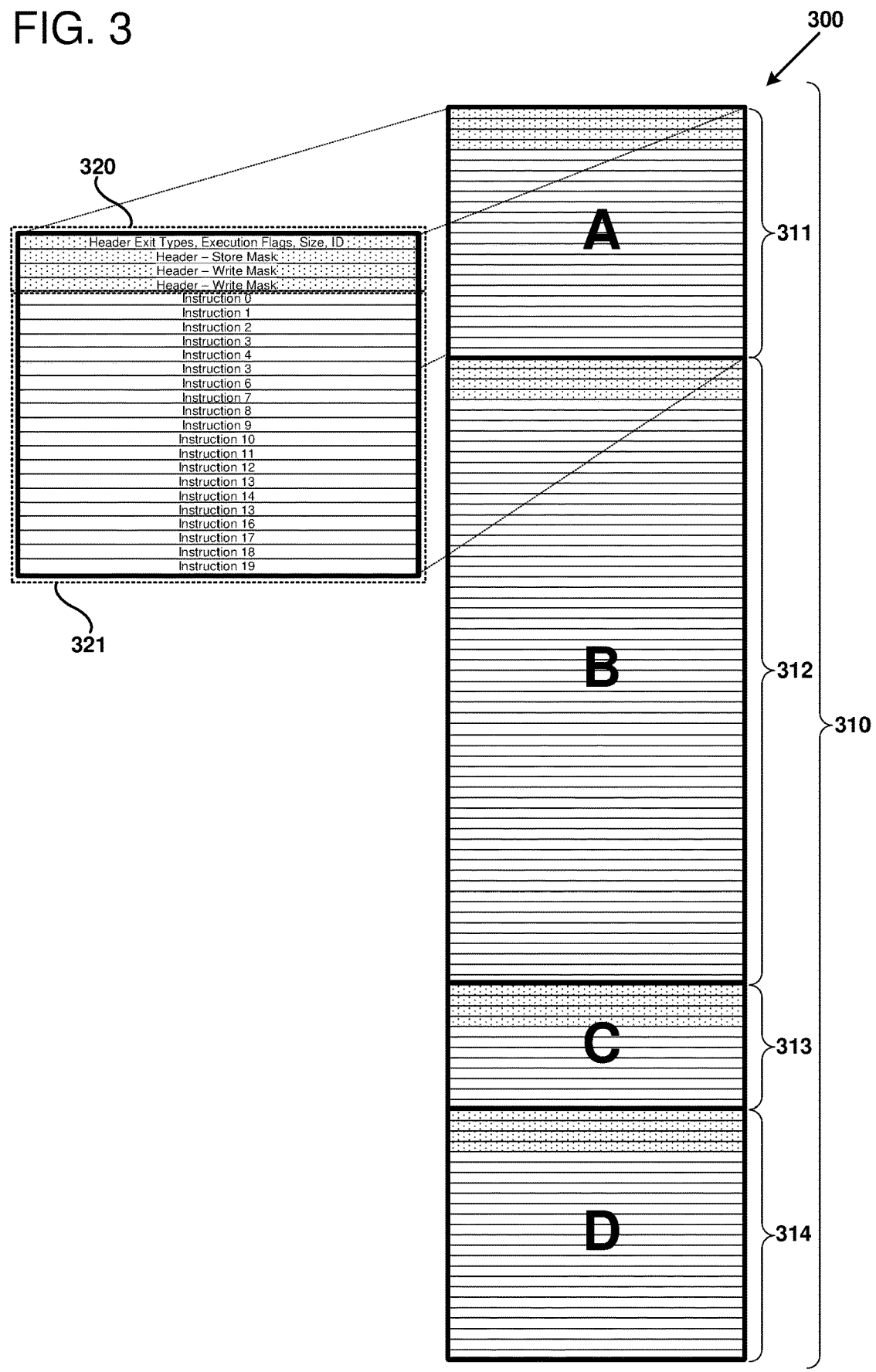
FIG. 3 illustrates a number of instruction blocks, as can be used in certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner In the example shown in FIG. 3, each instruction block begins with an instruction header, which is followed by a varying number of instructions. For example, the instruction block 311 includes a header 320 and twenty instructions 321. The particular instruction block header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of zero (0) indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution. Further, the execution flags can include a block synchronization flag that inhibits speculative execution of the instruction block.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, exception processing, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. The instruction block header can also include a write mask, which identifies which global register(s) the associated instruction block will write. In some examples, the store mask is stored in a store vector register by, for example, an instruction decoder (e.g., decoder 220). In other examples, the instruction block header 320 does not include the store mask, but the store mask is generated dynamically by the instruction decoder by analyzing instruction dependencies when the instruction block is decoded. For example, the decoder can generate load store identifiers for instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative operation. Because an instruction's dependencies are encoded in the instruction block (e.g., in the instruction block header, other instructions that target the instruction, and/or in the instruction itself), instructions can issue and execute out of program order when the instruction's dependencies are satisfied.

VI. Example Block Instruction Target Encoding

Figure 4:
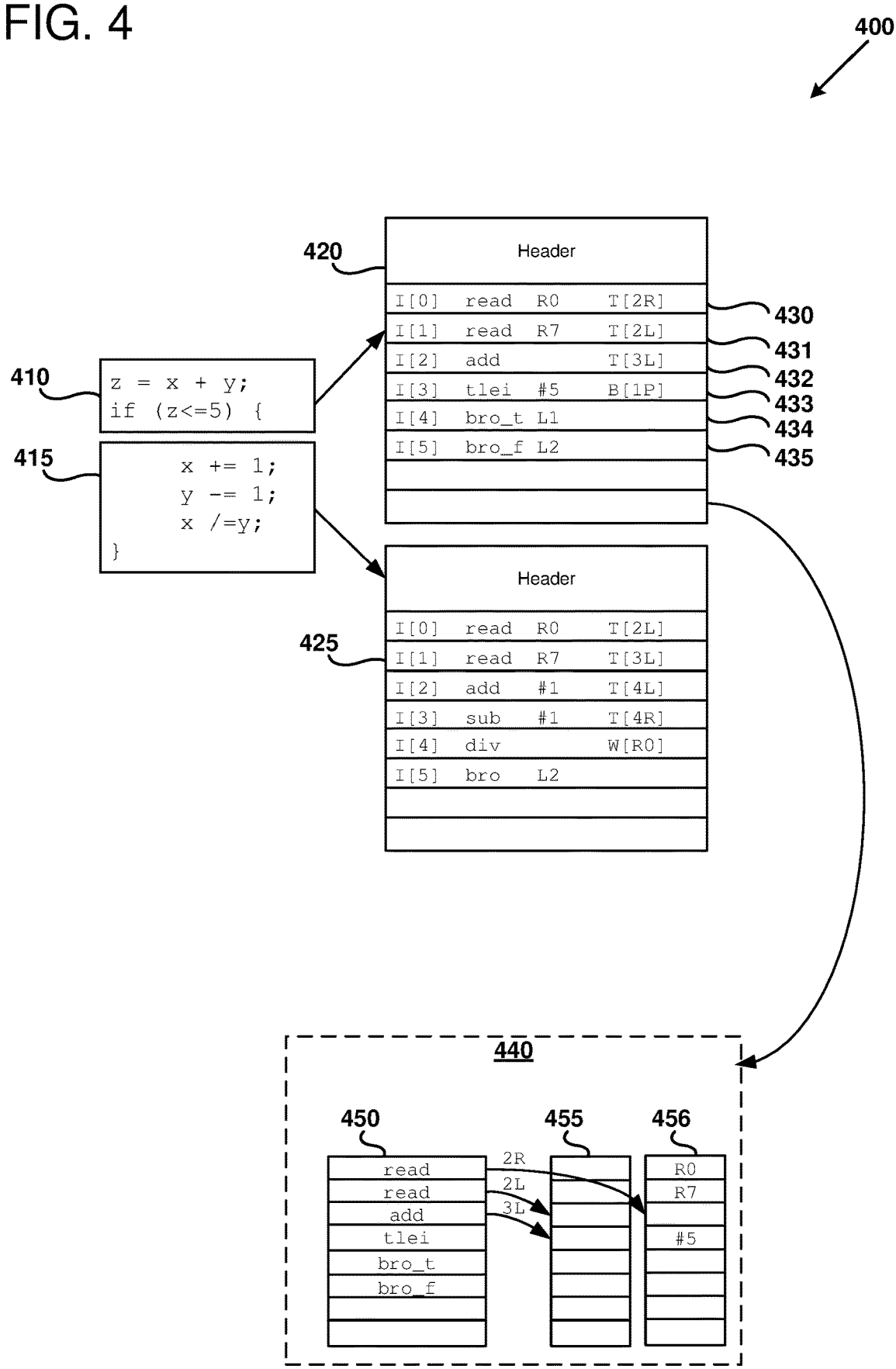
FIG. 4 illustrates portions of source code and respective instruction blocks.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 290); however any instruction can target the global register file. When the ADD instruction 432 receives the results of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will issue, but the other instruction, encoded with the complementary predicated, will not issue.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or memory store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a number of execution flag fields, an instruction block size field, and an instruction header ID bit (the least significant bit of the instruction header). In some examples, the instruction header 510 includes additional metadata 515 and/or 516, which can be used to control additional aspects of instruction block execution and performance In some examples, the additional metadata is used to indicate that one or more instructions are fused. In some examples, the additional meta data is generated and/or used by a hardware or software profiler tool.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution. The block synchronization flag occupies bit 9 of the instruction block and inhibits speculative execution of the instruction block when set to logic 1.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout results to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specify the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), an immediate field (IMM), and a target field (T1). In some examples, the memory access instruction 540 format further includes a load store identifier (LSID), which indicates a relative ordering in which memory access instructions are to be executed. However, in some examples, the use of serial, individual instruction commit as disclosed herein can allow for memory access instructions to not be encoded with such LSIDs. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field can be used as an offset for the operand sent to the load or store instruction. The operand plus (shifted) immediate offset is used as a memory address for the load/store instruction (e.g., an address to read data from, or store data to, in memory).

VIII. Example Processor Core State Diagram

Figure 6:
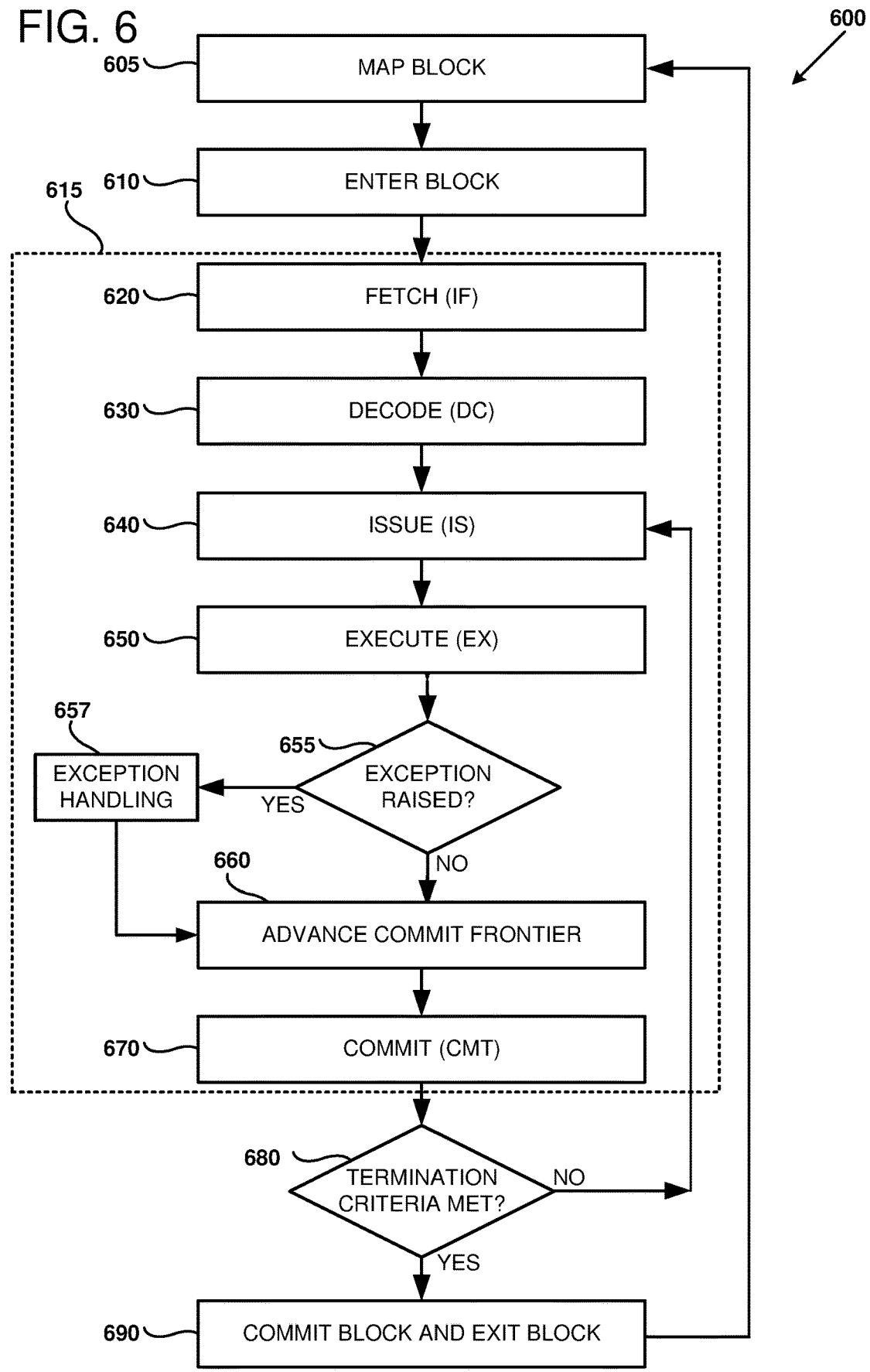
FIG. 6 is a flowchart illustrating an example of a progression of states of a processor core of a block-based processor.

FIG. 6 is a state diagram 600 illustrating number of states assigned to individual instructions within an instruction block as the instruction block is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. After the instruction block is mapped 605, the block is entered 610 so that execution of the block can begin. Control logic for the block-based processor, such as an instruction scheduler, can be used to monitor processing core resources of the block-based processor and map an unmapped instruction block to one or more of the processing cores. The instruction block can be resident in memory coupled to a block-based processor, stored on a computer-readable storage device such as a hard drive or a flash drive, and can be local to the processor or located at a remote server and accessible using a computer network. The unmapped instructions can also be at least partially resident in a cache memory coupled to the block-based processor.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been entered, the instruction block can proceed to evaluate individual instructions within the instruction block. These individual instruction block operations 615 are indicated by a dashed line in FIG. 6.

When an individual instruction is in the fetch state 620 (e.g., instruction fetch), the mapped processor core fetches data encoded for the instruction from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction, including generation of identifiers indicating relative ordering of memory access instructions. For example, the decoded instructions can be stored in one of the memory stores shown above, in FIG. 2. The decoding includes generating dependencies for the decoded instruction, operand information for the decoded instruction, and targets for the decoded instruction. Once at least one instruction of the instruction block has been decoded, the instruction block can proceed to issue state 640.

During the issue state 640, instruction dependencies are evaluated to determine if an instruction is ready for execution. For example, an instruction scheduler can monitor an instruction's source operands and predicate operand (for predicated instructions) must be available before an instruction is ready to issue. For some encodings, certain instructions also must issue according to a specified ordering. For example, memory load store operations may be ordered according to an LSID value encoded in each instruction. In some examples, more than one instruction is ready to issue simultaneously, and the instruction scheduler selects one of the ready to issue instructions to issue. Instructions can be identified using their IID to facilitate evaluation of instruction dependencies. Once at least one instruction of the instruction block has issued, source operands for the issued instruction(s) can be fetched (or sustained on a bypass path), and the instruction block can proceed to execution state 650.

During the execution state 650, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort state 660. In some examples, the control logic uses a write mask and/or a store mask for an instruction block to determine whether execution has proceeded sufficiently to commit the instruction block.

The processor can determine whether an exception is raised at 655. For example, a software exception or hardware interrupt can cause the processor to branch to an exception handling routine 657. Transient state for the current instructions can be saved so that a programmer, operating system, or other functionality can be used to view intermediate processor state for the instruction block. The transient state can then be restored after exception handling is complete. In some examples, transient state associated with individual committed instructions is not saved before proceeding to the exception handling routine.

At advance commit frontier state 660, the commit frontier for the instruction block can be advanced. The commit frontier indicates a boundary between instructions that can be committed and those that cannot. The commit frontier can be used to determine which instructions can be committed according to their serial ordering within the block, as well as used to evaluate early block termination criteria.

At the commit/defunct state 670, the processor core control unit determines that operations performed by an individual can be completed. For example memory load store operations, register read/writes, branch instructions, and other instructions that affect visible architectural state will be performed according to the control flow of the instruction block. For conditional memory instructions, data will be written to memory, and a status indicator value that indicates success can be generated during the commit/defunct state 660. Further, a dependency evaluation circuit can be used to determine whether there are any instructions that can be marked as defunct, because the instructions will not affect architectural state. For example, instructions that target instructions for a not-taken predicate and the targeted instructions themselves can be marked as defunct. Other instructions, such as NOP or malformed instructions that do not affect state can also be marked as defunct.

Termination criteria for the instruction block can be evaluated at 680. For example, if all instructions for a block are committed, can be committed, or are defunct, then the entire instruction block can be committed, and the instruction block proceeds to block commit state 690. If not all instructions are committed, but the remainder are defunct, then early termination criteria are met and the block proceeds to commit state 690. If the termination criteria is not met, then additional instructions can be issued at block commit state 640.

At the block commit state 690, control of the processor is transferred to the next instruction block indicated by the current instruction block's exit point. Any defunct instructions that have not issued, started execution, or completed execution can be quashed. The processor can proceed to branch to a different core, or to refresh or map the next instruction block on the current core that executed the instruction block.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Exception Handling

Processing exception events in block-based processors presents a number of challenges. Processors implemented according to such architectures can be configured to handle exceptions and interrupts immediately, by reversing execution of some instructions in the instruction block, or by waiting until the end of an instruction block to handle the exception event. As used herein, exception events include software-generated exceptions and hardware interrupts. Examples of suitable software exceptions that can be processed according to the disclosed technology include, but are not limited to: page faults, divide by zero errors, floating point anomalies, overflow conditions, illegal branch instructions (e.g., to an illegal branch location or mis-aligned target address), illegal memory accesses, memory violation (e.g., a memory load from an illegal or mis-aligned address location), security violation (e.g., an attempted access to memory or other processor resources not allowed by a process' current privilege level), or reaching debug breakpoints. Examples of suitable hardware interrupts include, but are not limited to, interrupts generated by timers, I/O interface signals. They include synchronous and asynchronous signal inputs to a processor core as well as signals indicating changes in power states or device malfunctions.

For some of these exception events, the exception handler is configured such that the architectural state is visible to the programmer. For example, when setting and using breakpoints for a debugger, it is often desirable that all of the architectural state for a core be made visible to the programmer. For other examples, such as page fault exceptions or timer interrupts, the event handler typically will not provide access to all architectural state. As shown in Table 1 below, exception events can be classified to whether the system state is visible to the programmer and according to how a program's control flow is affected.

TABLE 1

| | | Programmer View | |
| --- | --- | --- | --- |
| | | Visible | Invisible |
| Program control flow | Immediate halt | Example: Software breakpoint | Example: Page fault |
| | Delayed halt | Example: Keyboard interrupt handled by the program | Example: Timer interrupt handled by the OS |
| | Resume | Example: Software interrupts, debugging | Example: Page fault |
| | Not resumed | Example: Language-supported exceptions | Example: Illegal memory access |

Exception events in the "visible" column provide access to current architectural state, including the state of individual instructions within an instruction block. Examples of different types of handling of program control flow are shown in the different rows. For example, the program control flow can be immediately halted, halted after a delay, and an instruction block execution can be resumed, or not resumed.

In some operating modes of block-based processors, it is desirable to define precise exception semantics such that there is a defined sequential ordering for the instructions within the block. In some examples, the instructions in the block are ordered according to an order in which a compiler determines that dependencies for the instructions will be satisfied. In some examples, the instructions can be made to appear to execute in their sequential order in memory, such as when provided a debugging view to a programmer Thus, it may be desirable for certain examples of disclosed exception handling to provide a view of architectural state reflective of sequential execution of an instruction block up to the instruction at which an exception event was detected or generated. In some examples, a programmer may desire to alter system state at a trigger or break point, for example, register and/or memory location values. In some examples, a context record can be created to identify the excepting instruction. The context record can be used to permit the operating system to resume execution of the instruction block after exception handling has been processed. In some examples, the context record can be stored on a stack. In some examples, it is desirable that instructions that have side effects such as memory load store instructions not cause additional memory operations when execution of an instruction block is resumed. For example, loading or storing to or from an I/O register can influence the value of subsequent loads or stores from the same, or even different, I/O registers. In block architectures such as disclosed examples of block-based processors, instruction blocks commit, or do not commit, as a collection of side effects generated by the entire block. Thus, generating extraneous side effects can undesirably alter program state. However, in certain examples, a block can be partially committed with state that was generated up to an excepting instruction.

In some examples, a programmer can mark desired side effect instructions in a higher-level language program with a marker such as "volatile" and the compiler can flag such variables to the processor. The use of such instructions can present challenges for examples that include speculative execution.

In some examples, programmer invisible exceptions such as hardware interrupts can be handled at block boundaries. In such cases, a context record for the instruction block is created including architectural state of the block, the address of the start of the block as a restart point, and an instruction identifier for the excepting instruction. However, restarting instruction blocks after an interrupt can generate inconsistencies due to side effects from instructions executed prior to the interrupt. In some examples, the compiler can address this by moving side effect instructions into a separate instruction block. Such instructions can be coupled with fence instructions to avoid excessive performance impact. However, such an approach can increase code size and otherwise affect code quality. In other examples, a processor core has hardware to support logging results of a first portion of an instruction block and replay the block when the instructions are re-executed. For example, all of the memory load instructions in instruction block can be logged.

In processors using a block-granularity exception model, a simulator is used to emulate execution of the block during certain debug or exception handling operations. A subroutine jump is made to invoke the simulator. Then, the calling block is simulated. State of the instruction block is stored in memory of processor address space, for example, a page in system memory. Thus, the exception can be handled at hardware until the start of the block and then switched to a software simulator or emulator for instruction-precise handling. In some examples, the simulator can run on the same core. Thus, the simulator can supply any state information that the user requests about the block, and will commit user updates to the state to the processor hardware.

In other examples, a debugging engine runs on another core with hardware access to the architectural state of the processor core that is being debugged.

Handling of interrupts is similar to handling of exceptions in many respects, except that in some examples of interrupts, the handling does not need to be as precise. For example, the processor can service the interrupt immediately, or service the interrupt at the end of the block, or retroactively handle the interrupt and restart the block. In some examples, hardware interrupts may be masked or unmasked, and synchronous or asynchronous. Hardware interrupts are typically generated by timers or I/O devices, and a processor may include an interrupt unit configure to receive interrupt signals.

During typical operation of a block-based program, intermediate results (such as values of the operand buffers) produced within an instruction block are not available outside of a processor core where the instruction block is executed, at least until a block commits. However, the intermediate results can potentially be useful when a programmer is debugging a block-based program. In some examples of the disclosed technology, support is provided to potentially enable a programmer to debug a program targeted to the block-based processor. For example, support for debugging can be provided within compiler software, debug software, and/or the hardware of the block-based processor. The debugging tools are configured to have access to intermediate results generated during execution of an instruction block, before the block is committed. For example, operand values (left/right operand, predicate operands, or other suitable operands) can be transferred to a debugger via a suitable debugging interface.

X. Example Block-Based Processor Core Exception Handling Microarchitecture

Figure 7:
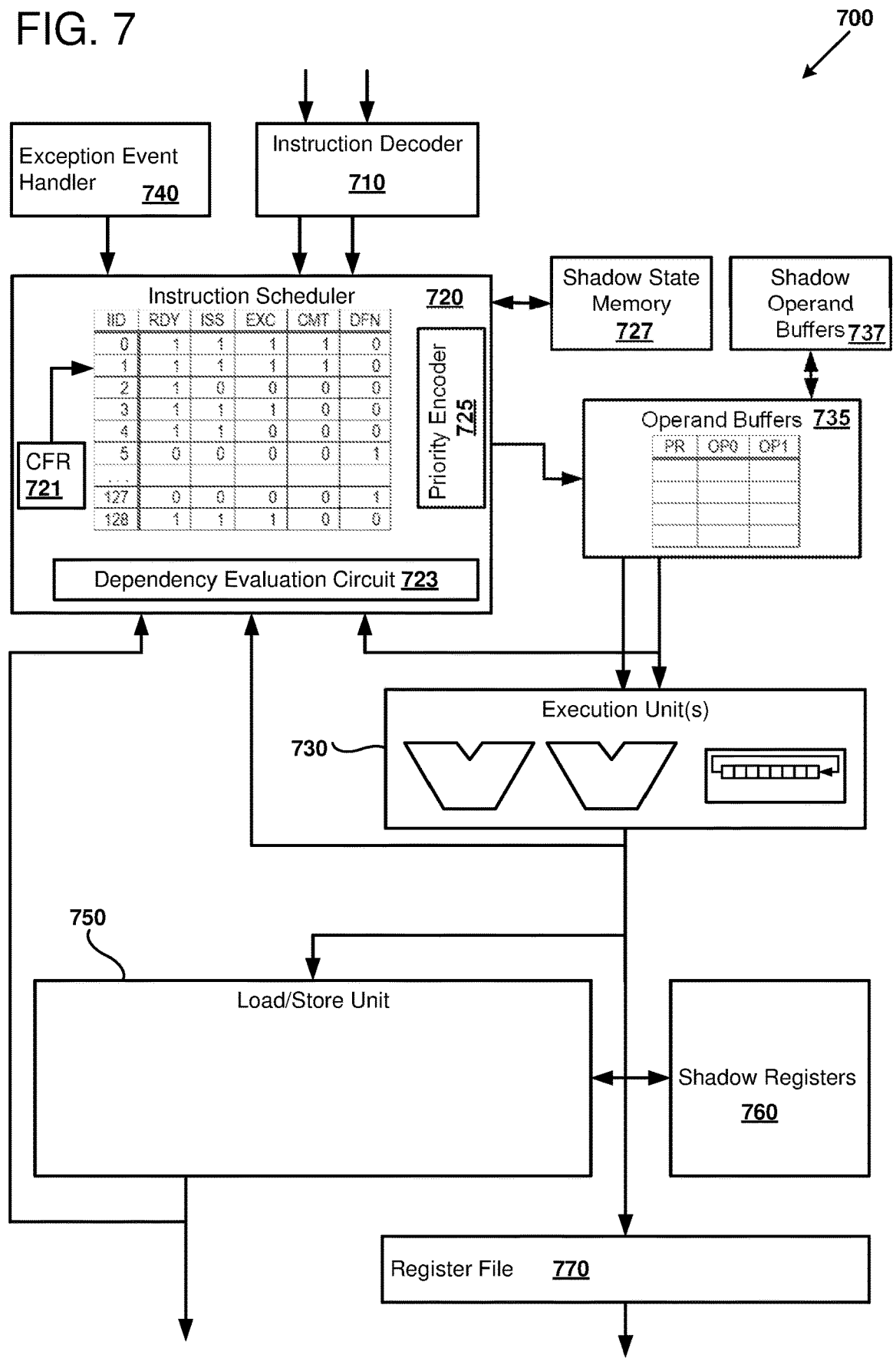
FIG. 7 is a block diagram outlining example hardware for resuming execution of an instruction block after processing an exception event, as can be used in certain examples of the disclosed technology.

FIG. 7 is a block diagram 700 illustrating an example block-based processor core including features for facilitating exception handling as can be performed in certain examples of the disclosed technology.

For example, the microarchitecture depicted in FIG. 2 can be further enhanced with the structures depicted in FIG. 7 in order to provide improved exception handling in example block-based processors.

An instruction decoder 710 decodes instructions received from an instruction cache and provides them to an instruction scheduler 720 in order to determine instructions that are ready to issue and select one or more of the ready instructions to be executed. The instruction scheduler 720 tracks a number of different types of data for instructions in an instruction block. The scheduler includes a commit frontier register (CFR) 721 that indicates the highest numbered instruction in the instruction block that can commit. For example, the CFR 721 can store a pointer to the highest numbered instruction identifier (IID) in an instruction block that can commit.

While much of the data tracked by the instruction scheduler is omitted from FIG. 7 for clarity, the instruction scheduler 720 shown stores a ready bit for each instruction in the instruction block, indexed by the instructions identifier (IID). When all dependencies for an instruction are satisfied, the instruction scheduler 720 sets the ready bit to indicate that the instruction can issue and execute. As discussed above, each instruction can have a variable number of dependencies, for example left operand, right operand, and/or predicate operands. In the illustrated examples, the instruction scheduler stores data for each instruction in a table in parallel. Ready bits and other scheduling information are provided to a priority encoder 725 which selects one or more instructions to issue. For example, the instruction scheduler 720 can include not only a ready bit (RDY) and an issue bit (ISS) for each instruction identifier, but can also include data indicating whether an instruction has completed execution (EXC), whether an instruction has committed (CMT), and/or whether an instruction is defunct (DFN). in other examples, other scheduler or data such as bits indicating whether an instruction is ready to commit can be encoded in the instruction scheduler 720.

The instruction scheduler 720 can include a dependency evaluation circuit that determines whether individual instructions within instruction block can commit. For example, the dependency evaluation circuit 723 can determine that an instruction can commit by evaluating a predicate condition for one or more instructions. This can include not only a predicate condition encoded for a particular instruction, but also predicates for other instructions that send target operands to, and/or receive target operands from, a particular instruction. In some examples, the dependency evaluation circuit 723 can include multilevel multiplexer logic that can use evaluated targets to evaluate additional instructions and the dependency chain within an instruction block. In some examples, the dependency evaluation circuit 723 evaluates at least one input operand of an individual instruction and when it is determined that the instructions input operand will not be generated, the circuit determines that the instruction either can be committed, or is defunct.

In some examples, the instruction scheduler 720 includes a block commit circuit that is configured to evaluate early termination criteria for instruction block and when the criteria indicates that the instruction block can commit, causes the scheduler to indicate that all instructions in the block can commit, or are defunct instructions that can be quashed. In some examples, the block commit circuit advances the commit frontier register to cause the instruction block to commit.

In some examples of the disclosed technology, all or a portion of such scheduling information can be logged by storing the data in a shadow state memory 727. The shadow state memory 727 stores copies of scheduler data that can be used to restore the block state after processing of an exception event has occurred. Suitable forms of memory for implementing the shadow state memory include but are not limited to registers, queues, and RAMs.

The operations for implementing the instruction can be performed by execution units 730. Operands that are generated for consumption by instructions are temporarily stored in a number of operand buffers 735. The operand buffers are monitored by the instruction scheduler 720, and when all of an instruction's dependencies are satisfied, is available for issue by the scheduler. In some examples of the disclosed technology, all or a portion of such operand values can be logged by storing the data in shadow operand buffers 737. The shadow operand buffers 737 store copies of operands that have been evaluated by the currently-executing instruction block. These stored values can be used to restore the block state after processing of an exception event has occurred. Suitable forms of memory for implementing the shadow operand buffers 737 include but are not limited to registers, queues, and RAMs.

The instruction scheduler 720 further receives exception event information from an exception event handler 740. Information provided by the exception event handler can include a signal indicating that an event has occurred, information for servicing the event, information about the type of the event (e.g., whether the event is a software exception or a hardware interrupt), or other attributes about the exception, for example whether the exception is masked, whether the exception was generated by a user process or a system process, whether the exception was received synchronously or asynchronously, a target location for transferring control flow of the processor to a second set of instructions, or other suitable exception information.

The example microarchitecture depicted also includes a load store queue 750, which stores data such as valid bits, which indicate whether a memory read instruction has executed successfully and thus loaded data into the load store queue, and the data itself, for example values read from memory using a memory load instruction. The example load store queue 750 is indexed by memory load store identifiers (LSID). In certain examples of the disclosed technology, memory access instructions can be encoded with an LSID field to indicate a relative ordering in which memory instructions must be executed according to the architecture. In some examples, memory access instructions within an instruction block must be executed according to their sequential order in the block. In other examples, dependencies or memory instruction ordering can be generated dynamically at run time. In some examples, the data stored for instructions in the load store queue can be used to later resume execution of the instruction block after returning from an exception handler. In other examples, data result operands generated by performing memory instructions can be stored in a number of shadow registers 760. Suitable forms of memory for implementing the shadow registers 760 include but are not limited to registers, queues, and RAMs.

When execution of an instruction block resumes after exception handling, the execution state of the instruction window can be restored by copying data from the shadow registers into appropriate registers in the data path. In the example of FIG. 7, the first three instructions having IIDs of 0, 1, and 2 have executed as reflected by the valid bit being set in the load store queue 750. When execution of the instruction block is resumed, the control logic for the instruction window can use the valid bits to avoid re-executing certain instructions, for example memory load instructions. This can avoid side effects generated by re-executing an instruction that reads the same memory address twice. For example, memory mapped I/O or other memory map structures may update the information that is read for subsequent instances of memory load instructions.

The example microarchitecture further includes a register file 770, which is used to store architectural register values, which can be passed to subsequent instruction blocks. Because the register values are typically all available when an instruction block is invoked, the values generated for register instructions are not typically logged for exception handling, as with memory and other instructions having side effects.

XI. Example Execution and Commit of Individual Instructions

FIG. 8 is a diagram 800 illustrating aspects of an example instruction block that can be executed and committed using example disclosed block-based architecture processors discussed herein. The instruction block includes an instruction identifier (IID), a mnemonic description of the instruction, and a description of the instruction's target operations. The example instruction block also includes a number of comments, but these do not actually form part of the instruction.

As shown, instruction I[7] compares R3 minus 1 (the contents of register R3 less one) to zero and generates a predicate that is sent to the predicate slot of target instructions I[8] and I[10]. These target instructions will not execute unless the received predicate matches their encoded predication condition, true ("add_t") or false ("add_f"), respectively. The add_f instruction I[10] in turn sends its result to instruction I[11]. This is an example of head predication.

In the illustrated example, instruction I[11] receives the result of a memory load caused by executing instruction I[2]. In some cases, the latency of the load instruction I[2] may be very long, for example, in the case of a cache miss or if the memory address resides at a virtual memory location not currently loaded in main memory. In processor examples where all non-predicated instructions must be executed before an instruction block commits, this can create large delays, as the block will not be committed until the long latency load instruction completes execution. When the predicate condition of instruction I[7] is true, waiting for this completion is unnecessary, as the load instruction, and the instructions along the false predicate path will not execute, and hence will not affect the visible architectural state of the processor. Thus, by committing instructions on an individual instruction basis, as well as identifying instructions within a block that are defunct, execution and performance can be improved by avoiding such latency.

FIGS. 9A-9F are diagrams illustrating instruction scheduler state as the instruction block described above regarding FIG. 8 executes. It should be noted that some simplifications are made in the diagrams for ease of explanation. For example, the instructions are illustrated as if all of the instructions have been fetched and decoded by a processor, while in actual implementation, the instructions may actually be fetched and decoded in a pipelined fashion, and so not all instructions will be visible to the scheduler when execution of an instruction block begins.

As shown in the diagram 900 of FIG. 9A, the instructions have just been fetched and decoded, but no instructions are ready to issue. Thus, all the bits of scheduler data are set to zero ("0"). The commit frontier register 721 indicates that no instructions in the block are ready to be committed.

Figure 9B:
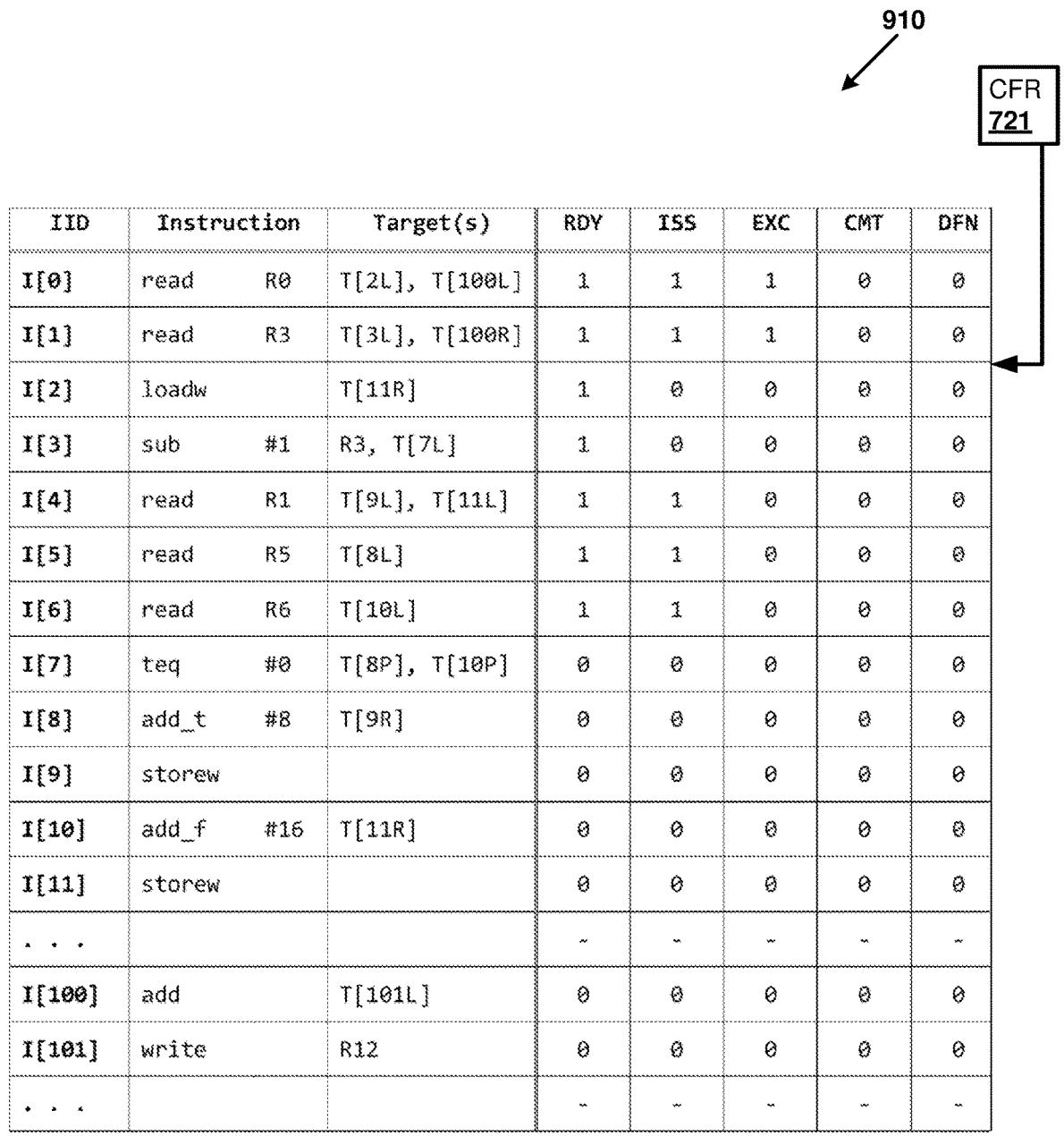

In the diagram 910 of FIG. 9B, read instructions I[0] and I[1] have issued and executed. Thus, the commit frontier register 721 indicates that these two instructions are ready to be committed. Other instructions within the block are in various other states of scheduling. For example, instructions I[2] and I[3] have all of their input dependencies available, and hence are ready to issue. Instructions I[4], I[5], and I[6] are register read instructions. In the disclosed block architectures, register values are available when the instruction block begins execution. Hence, these instructions have issued, as there is no memory latency or waiting on a input offer and from another instruction within the instruction block. Instruction I[2], loadw, has not yet received its target address, which is generated by instruction I[0], and so is not yet ready to issue.

Figure 9C:
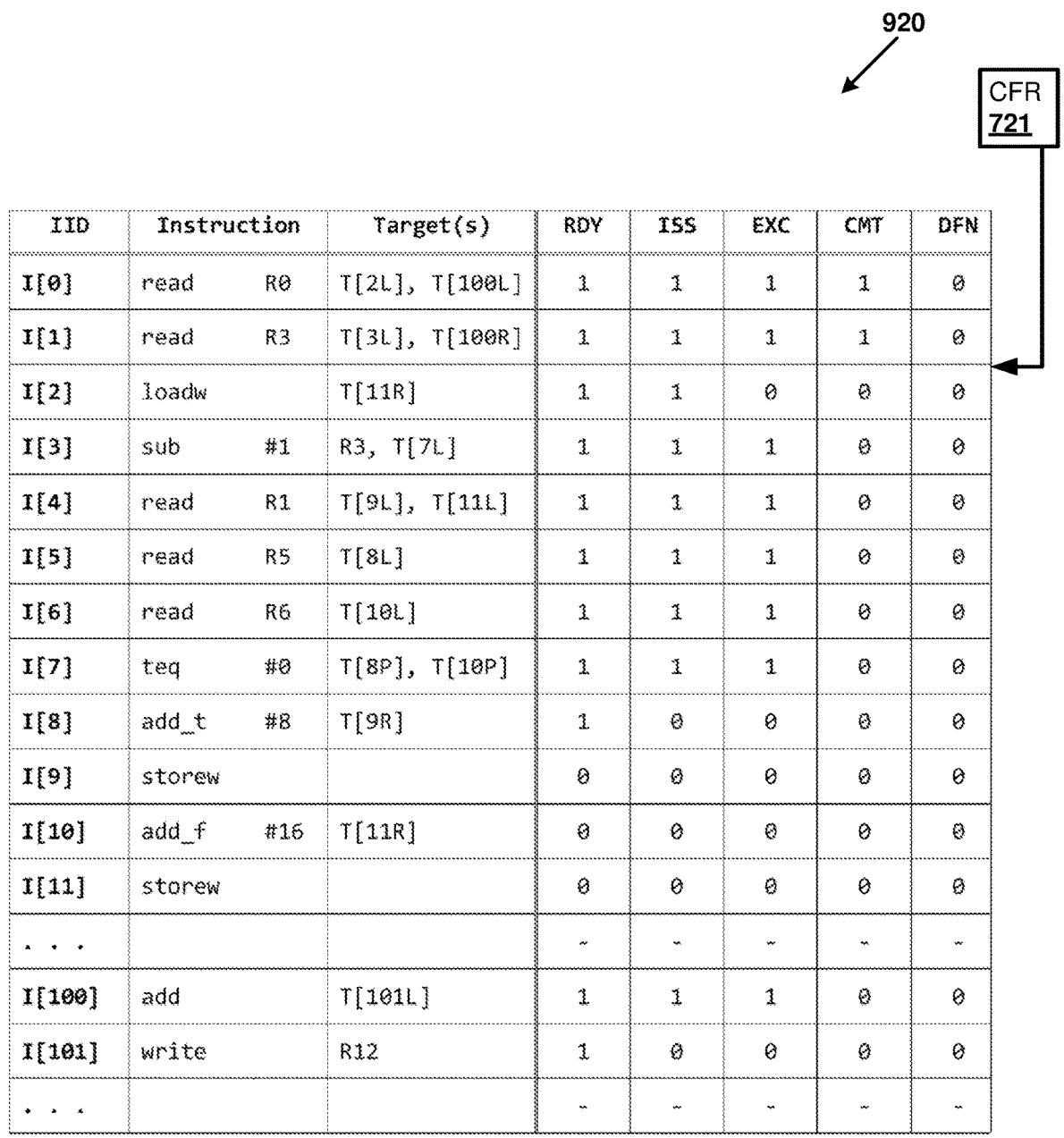

In the diagram 920 of FIG. 9C, the loadw instruction I[2] issued, but is still executing, as there is a long memory latency, for example, due to a long miss penalty (e.g., from a cache or virtual memory miss). Hence, its EXC bit is still set to 0. Instructions I[3]-I[7] and I[100] have executed. However, because instruction I[2] has not executed or been marked as defunct, and hence cannot be committed, the commit frontier register 721 still indicates that only instructions I[0] and I[1] are within the commit frontier.

Figure 9D:
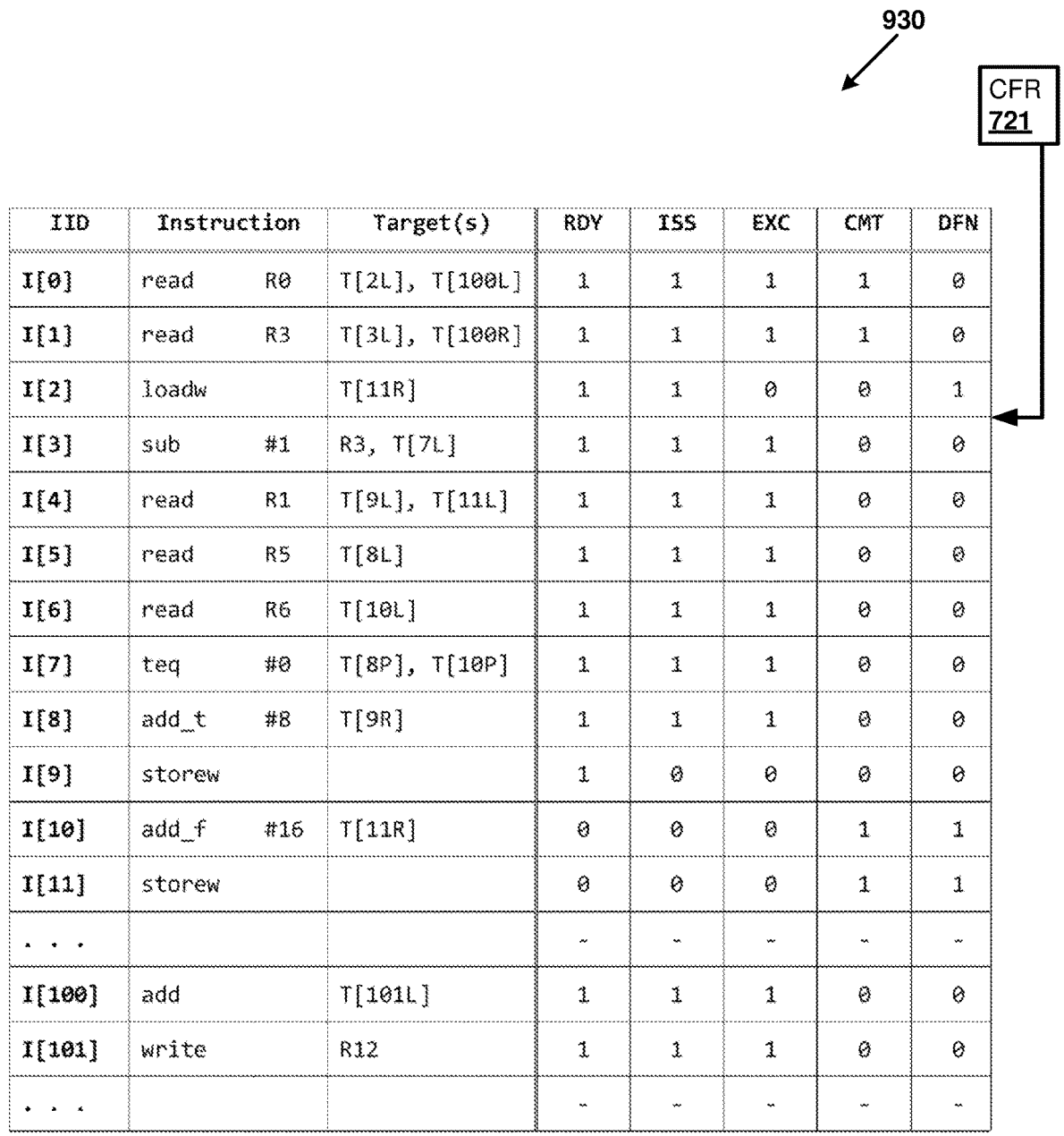

In the diagram 930 of FIG. 9D, a predicate condition has generated by the teq instruction I[7]. The processor dependency evaluation circuit evaluates predicates and instructions within the instruction block. Here, because the only receiver of the target operator and generated by the loadw instruction I[2], relies on a predicate condition that is not satisfied, the loadw instruction I[2] is marked as both committed and defunct. Thus, the commit frontier register 721 is advanced to indicate that instructions I[0] through I[2] are ready to commit Instructions encoded with a not-taken predicate can be immediately marked as defunct when the predicate has been evaluated.

Figure 9E:

In the diagram 940 of FIG. 9E, the loadw instruction I[2] has committed. Further, instructions I[3] through I[7] have executed and committed. The add_t (predicated true add) instruction I[8] executed and is ready to be committed. Thus, the commit frontier register 721 indicates that instructions I[0] through I[8] are within the commit frontier. Further, instructions on the predicate path that is not taken, including instructions add_f (predicated false add) I[10] and storew I[11], which receives an input operand from the add_f instruction I[10] are marked as defunct. That is because these two instructions would not affect any architecturally visible state of the processor if they were executed. After the storew instruction I[9] finishes execution, the commit frontier register 721 will be advanced past the add_f instruction I[11], as illustrated in the diagram 950 FIG. 9F.

In some examples, the scheduler tracks committed instructions and defunct instructions separately. In other examples, the scheduler can mark defunct instructions by marking the associated instructions commit scheduler bit.

XII. Example Instruction Reorder Optimization for Individual Instruction Commit FIG. 10 is a diagram 1000 of block-based processor code similar to that of FIG. 8, where one of the instructions has been reordered. In particular, the loadw instruction has been moved from IID I[2] to IID[9]. The diagram 1000 illustrates the state of the instruction scheduler after a number of instructions have been executed. All of the register read instructions have executed and committed. The subtract instruction I[2] and the teq instruction I[6] have executed, but have not yet been committed. Because the loadw instruction has been moved further down in sequential order, the commit frontier indicated by the commit frontier register 721 can be advanced further. Thus, there are opportunities for programmers and compilers to order code to encourage the commit frontier to advance earlier during execution of an instruction block. For example, static or dynamic analysis of the program can be used to generate probabilities associated with various predicate conditions, in order instructions that are less likely to be executed due to the associated predicate conditions to a lower point within the instruction block.

XIII. Example Explicit Encoding of Predicates

FIG. 11 is a diagram 1100 of block-based processor code similar to that of FIG. 8, where the instruction I[7], which generates a predicate condition is encoded in a format that allows the predicate to be sent to four instructions. As shown in FIG. 11, the predicate conditions are explicitly encoded within the instruction block. For example, add_t instruction I[8] and storew_t instruction I[9] are both explicitly encoded with the predicate condition. This can improve performance or reduce complexity of dependency analysis circuitry, because implicit predicate situations do not need to be evaluated.

In this particular example, a variable length instruction format can be used to allow more than two target operands to be specified by the instruction. In other examples, a broadcast predicate can be used to send the generated predicate condition to a larger number of instructions. In head predication, if the predicate matches, all instructions in the dependence chain are examined and executed, as they would be in the block-commit model. In head predication, if the predicate does not match, hardware can propagate the non-matching predicate down the dependence chain and commit the instructions by treating them as NOP. Extra cycles may be spent to propagate the predicate. In high-performance, high instruction-level parallel implementations, the extra cycles to propagate non-matching predicate can be saved as follows. In one approach, persistent instructions in the head-predicated dependence chain may be predicated (tail predicated) in addition to the head instruction in the chain. Doing so helps identify the persistent instruction to hardware in a dataflow fashion, therefore not needing to serially propagate the predicate to the persistent instruction. This can help the hardware to examine instructions quickly. Persistent instructions are instructions that modify architectural state that persists beyond execution of an instance of a block. Instructions that modify general-purpose registers, memory, or system registers in block-based architectures such as those disclosed herein are examples of persistent instructions.

XIV. Example Tail Predication with Null Instruction

FIG. 12 is a diagram 1200 of block-based processor code similar to that of FIG. 8, where an explicit normal instruction has been added to nullify instructions that implicitly rely on a predicate condition. This can be referred to as tail predication. Thus, all instructions are to be evaluated for execution. In the illustrative example, the storew instruction that receives operands generated when the predicate is false can be nullified by the normal instruction. Use of such novel instructions can simplify design of dependency evaluation circuitry, or improve performance by allowing instructions on not taken predicate paths to be identified earlier or with less logic. For example, the null instruction can send a nullification signal to a plurality of instructions within the instruction block, allowing the nullified instructions to be marked as defunct and/or committed.

XV. Example Conditional Store

FIG. 13 includes two diagrams 1300 and 1350 of code for a block-based processor illustrating another aspect of the disclosed technology. The diagram 1300 depicts how a store conditional operation might be implemented in a block processor that does not support serial, individual instruction commit. As shown, because individual instructions with an instruction block are not committed until the entire block is ready to commit, two instruction blocks "try" (which executes the store conditional instruction sc) and "check" (which performs the test of the conditional bit) are required to implement the illustrated store conditional operation. In other words, the try instruction must have its write instruction committed, before the store conditional bit can be evaluated by the load instruction and test instruction, teqz.

The diagram 1350 depicts how a store conditional operation might be implemented in a block-based processor that supports serial, individual instruction commit. As shown, the value of the store conditional instruction can be evaluated by the test instruction, teqz, encoded in the same instruction block "try." This is because the store conditional instruction, sc, is individually committed, and thus the test instruction will not issue until the store conditional instruction has executed.

XVI. Example Format for Logging Instruction Block State for Exception Handling FIG. 14 is a diagram 1400 illustrating example formats in which intermediate instruction block results can be logged and restored in performing exception and/or interrupt handling, as can be implement it in certain examples of the disclosed technology. For example, the illustrated format can be used to store data in a shadow operand buffer such as that discussed above regarding FIG. 7. Data including target program counter valid, instruction predicates field valid, global register right map, broadcast valid, predicate valid, target program counter, instruction predicates, broadcast register status, broadcast predicate values, operand buffer predicates, operands, and associated valid bids can be stored according to the exemplary format. The diagram 1400 also includes the relative location of where the intermediate values are stored relative to memory location EXC_SAP. It should be readily understood to one of ordinary skill in the art having the benefit of the present disclosure that other suitable formats and memory address schemes for storing intermediate instruction block data can be used for processing exceptions according to the disclosed technology.

XVII. Example Dependency Evaluation Circuit

Figure 15:
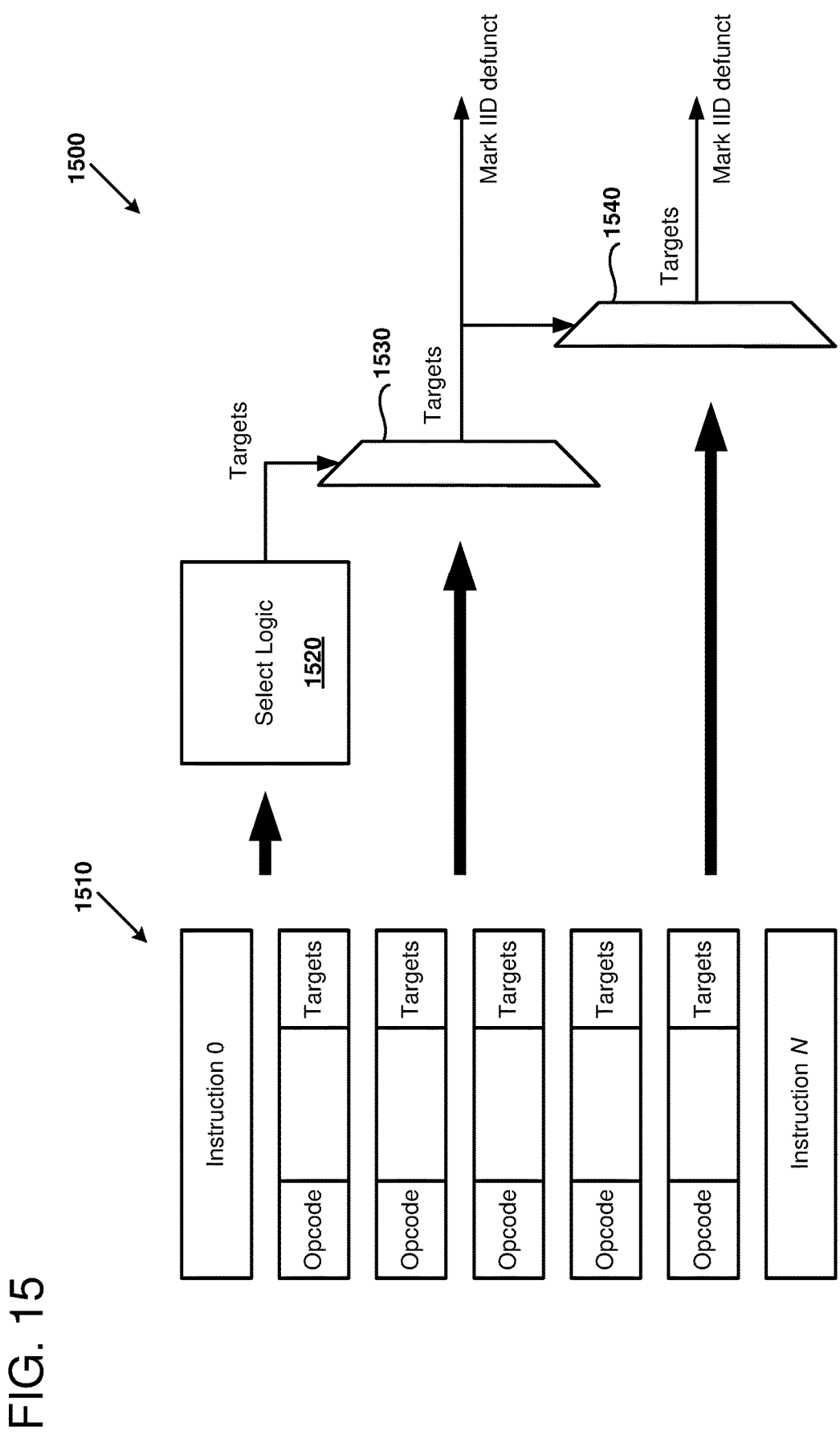
FIG. 15 is a block diagram of a dependency evaluation circuit, as can be implemented in certain examples of the disclosed technology.

FIG. 15 is a block diagram 1500 of an example dependency evaluation circuit, as can be implemented in certain examples of the disclosed technology. As shown, a number of instructions 1510 including their opcodes and target instruction specifiers are accessible to the dependency evaluation circuit. Select logic 1520 is used to select dependencies of particular instructions to evaluate. When it is determined that the evaluated instructions can be committed, these targets can be used to further select additional instructions in the dependency chain. As shown in the block diagram 1500, multiple layers of selection logic including a first level 1530 and a second level 1540, evaluation can be performed on the chain in a single combinational logic cycle. Thus, instructions on predicate not taken paths can be marked as defunct. This allows the commit frontier of the instruction block to proceed further, and earlier, than if all dependencies were evaluated before marking instructions as committed and/or defunct.

The select logic 1520 can be similar to the select part of issue logic (without actually issuing the instructions), and operate in one or more levels. Depending on the length of the chain and the actual design of walk logic, the walk may require one or more clock cycles to complete evaluation.

Every cycle, the select logic 1520 can monitor newly defunct instructions. One or more instructions are selected at the first level 1530, and their targets used to select the next level 1540 of instructions in the walk, marking them defunct. Targets of the second level instructions can be identified and also marked as defunct. More levels can be added in the walk in the same cycle, or this process may be repeated in the next clock cycle. For example, if instruction predicate level 1 includes one instruction, its two targets form the level 2 set, which in turn can have up to four targets. Therefore, in one cycle, up to 6 instructions can be marked defunct. More aggressive designs can add more logic to evaluate additional levels in the walk in one cycle.

It will be readily understood to one of ordinary skill in the relevant art having the benefit of the present disclosure that other suitable implementations of dependency evaluation circuits could be used.

XVIII. Example Method of Advancing Commit Frontier

Figure 16:
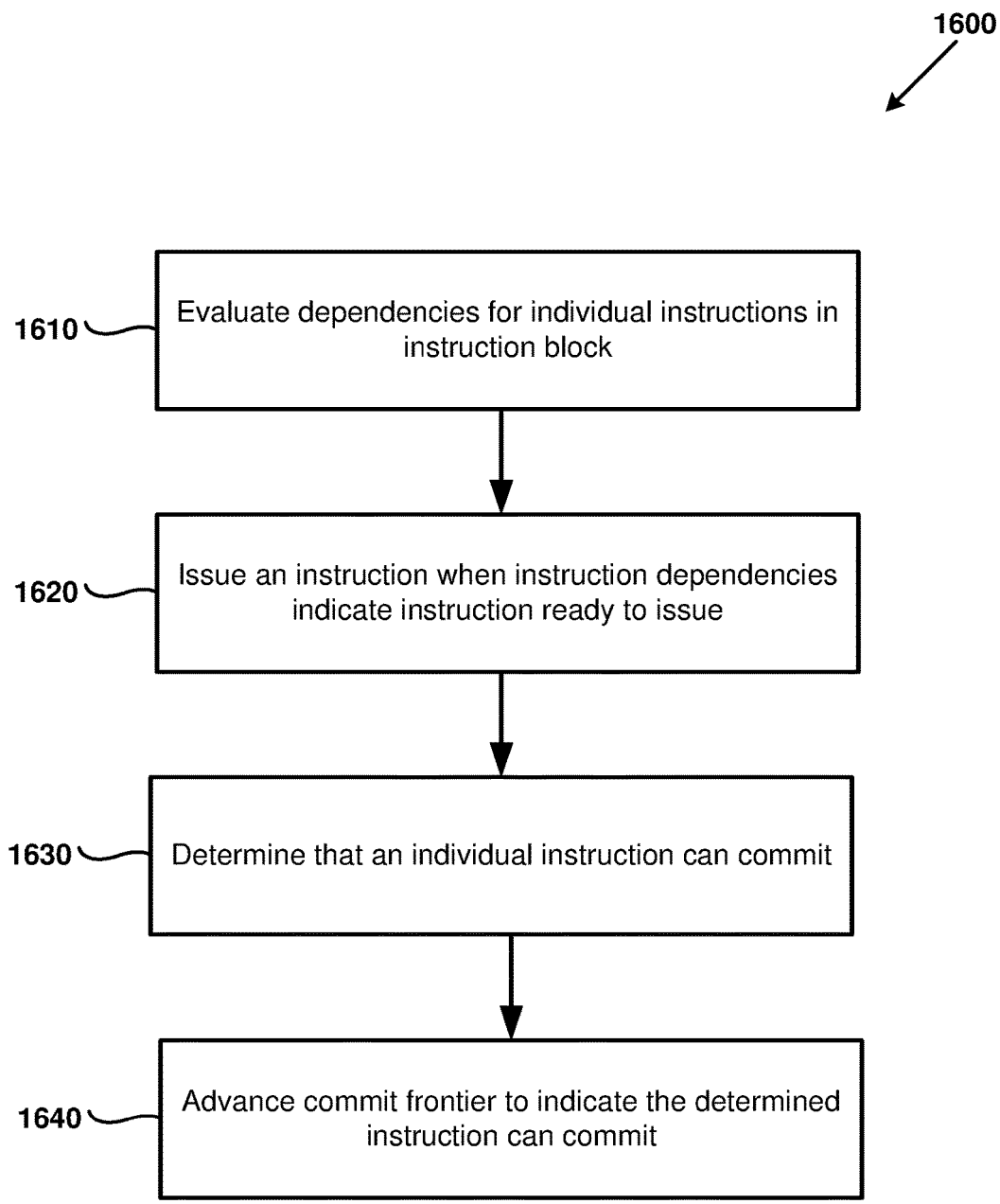
FIG. 16 is a flow chart outlining an example of executing an instruction block using serial, individual instruction commit, as can be implemented in certain examples of the disclosed technology.

FIG. 16 is a flow chart 1600 outlining an example of method of advancing a commit frontier when executing an instruction block with a block-based instructions that architect or processor, as can be implemented in certain examples of the disclosed technology. For example, the processor architectures discussed above regarding FIG. 1, 2, or 7 can be used to implement the illustrated method.

At process block 1610, dependencies are evaluated for individual instructions within an instruction block. This can include evaluating whether a target operand sent to a receiving instruction has been generated and is valid, whether register read instructions or memory load instructions have evaluated, or evaluating other relevant instruction dependencies. This evaluation can be performed by an instruction scheduler, such as those discussed above.

At process block 1620, and instruction is issued when its associated dependencies indicate that the instruction is ready to issue. For example when all of an instruction's input operands, including its associated predicate, if any, are available, then the instruction scheduler can choose to issue the associated instruction. The issued instruction will eventually be executed, and generate results.

At process block 1630, logic in the instruction scheduler determines whether an individual instruction can commit Thus, if an individual instruction has executed, or an individual instruction has been marked as defunct, because the instruction will not affect the architectural state of the processor, then it is determined that the individual instruction can be committed. A dependency evaluation circuit can be used to evaluate operands, determine that at least one of the instructions operand will not be generated, and thus determine that the associated instruction can be marked as defunct and committed.

At process block 1640, a commit frontier for the block is advanced in order to indicate that the determined instruction can be committed. For example, a commit frontier register as discussed above can include a pointer that indicates a point in the instruction block where all of the lower-ordered instructions can be committed. Thus, while instructions in the instruction block can execute in different orders based on when the associated dependencies for those instructions arrived, the individual instructions will still commit in an order specified by the instruction block. Typically, the commit order is indicated simply by the ordering of the locations in which instructions are stored in the block, although other suitable techniques can be used to specify the commit order for the instruction block. For some instruction blocks, instructions that do not affect the architectural state can be indicated as defunct. The commit frontier can be advanced to include not only instructions that executed and can commit, but also instructions that are marked defunct. Hence, it should be noted that individual instructions beyond the commit frontier can issue and execute, but will still be committed according to the associated instruction block ordering.

XIX. Example Method of Committing Block with Early Termination Criteria

Figure 17:
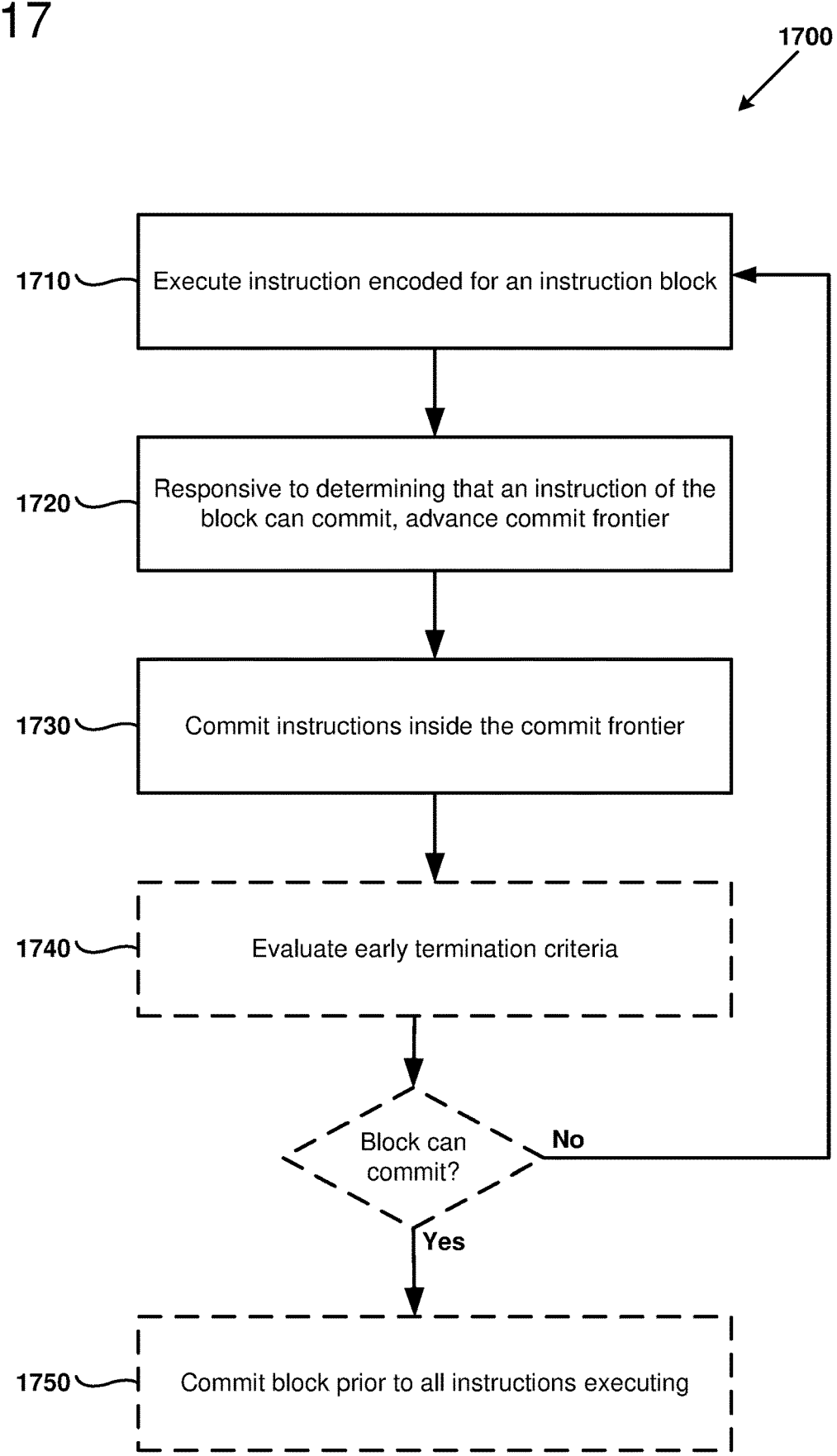
FIG. 17 is a flow chart outlining an example of executing an instruction block using serial commit and early termination criteria, as can be implemented in certain examples of the disclosed technology.

FIG. 17 is a flow chart 1700 outlining an example method of committing instructions, and optionally evaluating early termination criteria, as can be performed in certain examples of the disclosed technology. For example, the processor architectures discussed above regarding FIG. 1, 2, or 7 can be used to implement the illustrated method. This can allow for a block to be terminated early, thereby increasing processor performance by allow the next instruction block to execute sooner.

At process block 1710, one or more instructions encoded for an instruction block are executed.

At process block 1720, responsive to determining that an instruction of the instruction block can commit, a commit frontier for the instruction block is advanced to include an indication of all instructions in the instruction block than can commit In some cases, this includes determining that an individual instruction can commit by determining that the instructions associated predicate condition is not satisfied. This can include predicate conditions encoded within the instruction, as well as implicit predicate conditions determined by analyzing other instructions that generate target operand sent to the subject instruction. For example, the method can determine that an individual instruction can be committed because it is defunct, by determining that at least one input operand of the individual instruction will not be received. In some examples, a NULL instruction can be used to generate a nullification signal that indicates that the instruction can be committed.

At process block 1730, one or more instructions within the commit frontier are committed. This includes performing operations that affect state outside of the instruction block, including writing to registers, storing memory values, changing condition flags, or other operations that affect the programmer-visible state.

At process block 1740, early termination criteria for the instruction block are evaluated. In other words, control logic circuitry evaluates whether all instructions within the instruction block have committed, or have been marked as defunct. Thus, it is not necessary to execute remaining instructions, which will not affect the architectural state of the processor, before committing the instruction block. In some examples, the instruction block is committed prior to all of the instructions executing, based on evaluating the early termination criteria. In some examples, evaluating the early termination criteria includes determining that no unexecuted instructions in the instruction block would affect the processor architectural state if executed. In some examples, the early termination criteria include at least one of the following: all instructions of the instruction block have been considered for issue, all issued persistent instructions have completed, all unissued persistent instructions are defunct, any executing instruction will not cause an exception, and/or the next block to execute has been identified. In some examples, all of these listed early termination criteria must be satisfied in order to perform early block commit. If it is determined that the block cannot commit, because the early termination criteria are not satisfied, the method proceeds to process block 1710, in order to execute additional instructions within the instruction block. If it is determined that the instruction block can commit, the method proceeds to process block 1750.

At process block 1750, the instruction block is committed prior to all of its instructions completing executing. For example, instructions that do not affect the processor state, such as instructions that are predicated on the condition that was not satisfied, or instructions that are malformed, do not need to execute prior to committing the instruction block. After the instruction block has been committed, a next instruction block from the current instruction blocks exit point can begin execution.

The early termination criteria discussed above, except unissued defunct persistent instructions, can be detected during the normal course of block execution. Detecting an unissued persistent instruction may require additional techniques. It can be detected by one of several ways. For example, after a predicate is computed and delivered to the target instruction, the instruction can be immediately deemed as defunct. As another example, tail-predicated persistent instructions can be marked defunct immediately upon predicate arrival (and comparing it against the encoded instruction).

When head predication is used, dependent instructions do not explicitly receive the predicate. In such cases, after the predicate is delivered to the head, a dependency evaluation circuit can transitively walk the dependence chain, using the targets encoded in the instructions, to identify all dependent defunct persistent instructions.

XX. Example Method of Exception Handling with Individual Instruction Commit

Figure 18:
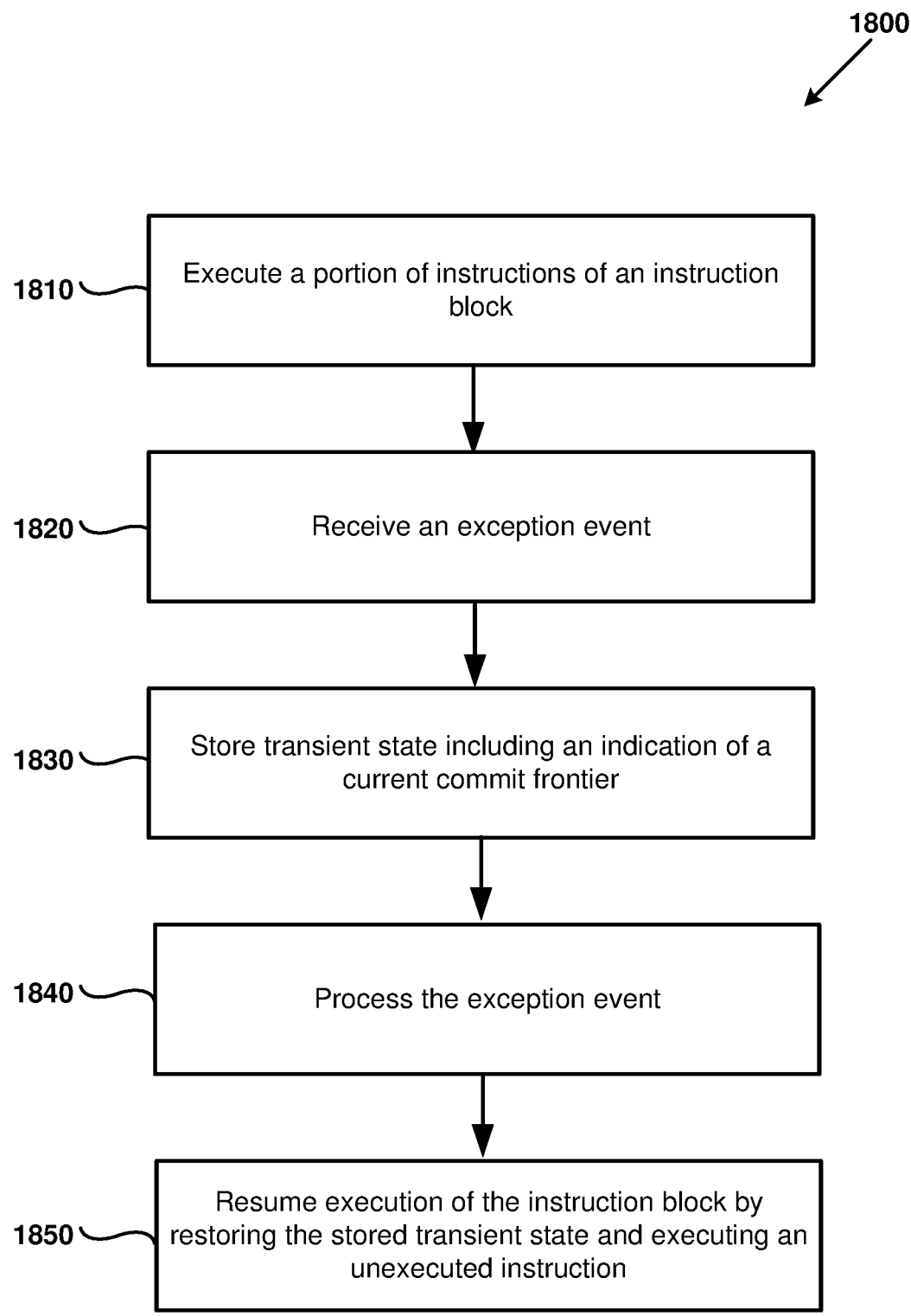
FIG. 18 is a flow chart outlining an example method of executing an instruction block including processing an exception event, as can be implemented in certain examples of the disclosed technology.

FIG. 18 is a flow chart 1800 outlining an example method of processing exceptions in a processor that includes the ability to individually commit instructions, as can be implement it in certain examples of the disclosed technology. For example, the example processors disclosed above regarding FIG. 1, 2, or 7 can be used to implement the illustrated method.

At process block 1810, a portion of instructions of an instruction block are executed depending on a particular instruction, this execution can include evaluating a predicate condition and responsive to the evaluating, marking and instruction and instruction block as defunct as depending on a not satisfied predicate condition.

At process block 1820, an exception event is received. For example, the exception may be raised by a software condition, for example a divide by zero operation or a software interrupt, or the exception can be raised by a hardware interrupt. When the exception event is received, execution of the currently executing instruction block is temporarily ceased.

At process block 1830, transient state for the instruction block is stored, including an indication of the current commit frontier for the instruction block. As discussed above, the commit frontier includes instructions that can be committed, have been committed, as well as any defunct instructions. The commit frontier can be advanced to include instructions marked as defunct. The commit frontier can be advanced to include instructions that are ready to be committed, as well as instructions that have been committed. The transient state can be stored in any suitable memory structure, for example the memory structures discussed above regarding FIG. 14. The transient state can include broadcast register values and valid bits indicating whether these values are valid, and operand values and valid bits indicating whether particular operand values are valid. Results in GPRs and memory need no special handling and so need not be saved separately. However, results in operand buffers and broadcast registers for unexecuted instructions will be saved so that execution of the block can resume without reexecuting instructions. Only those results that are needed by the incomplete portions of the block need to be saved. In addition to the values, the specific transient state for these instructions is recorded. This state, values and identity, is together referred to as the restart state.

The restart state can be saved in a programmer-allocated save area. This can be done by software or hardware. The save area itself can be treated as a stack or a heap, or other suitable structure.

At process block 1840, the exception event received at process block 1820 is processed. This can include branching to a second instruction block that initiates exception handling. In some examples, the exception can be a software breakpoint set by a program or, an exception handling includes operating a debug are such that the program or can evaluate the processor state at that breakpoint. Because instructions have been committed individually, the processor state presented to the programmer more closely represents what the processor state would appear to the programmer in a more traditional processor architecture. Further, storing and handling of in-flight data for the block that has not been committed can be simplified, because more instructions have been committed. In some examples, the programmer views data with a debugger as if executed, but noncommitted instructions have committed. In other examples, only instructions that have actually been committed, but not instructions that are only ready to commit, have their state presented to the programmer Other operations that can be performed to process the exception event can include calling handling routines in the operating system, or other suitable exception event routines.

At process block 1850, execution of the instruction block is resumed by restoring the stored transient state that was stored at process block 1830. Execution of the instruction block can proceed by executing any unexecuted instruction that has all of its dependencies ready. Thus, use of the stored transient state allows resuming instruction block execution without replaying instructions that have already executed, but also allows handling of the exception immediately, without waiting for the current instruction block to commit Thus, all committed state is available to the programmer, even though the interrupted block has not committed.

XXI. Example Computing Environment

Figure 19:
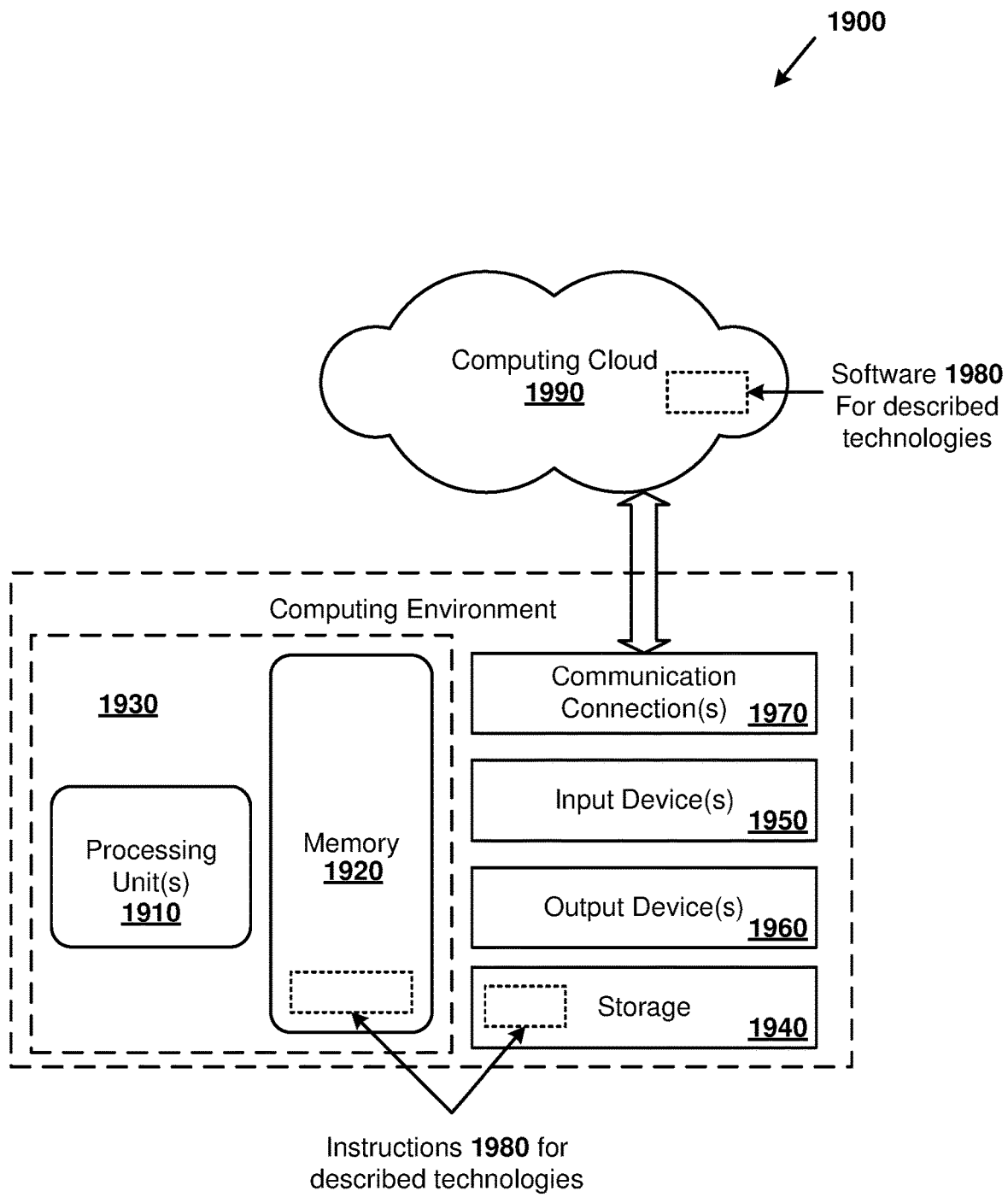
FIG. 19 is a block diagram illustrating a suitable computing environment for implementing some embodiments of the disclosed technology.

FIG. 19 illustrates a generalized example of a suitable computing environment 1900 in which described embodiments, techniques, and technologies, including committing individual instructions and processing events such as software exceptions and hardware interrupts, while executing an instruction block targeted for a block-based processor, can be implemented.

The computing environment 1900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 19, the computing environment 1900 includes at least one block-based processing unit 1910 and memory 1920. In FIG. 19, this most basic configuration 1930 is included within a dashed line. The block-based processing unit 1910 executes computer-executable instructions and may be a real or a virtual processor. In a multi-processing system, multiple processing units execute computer-executable instructions to increase processing power and as such, multiple processors can be running simultaneously. The memory 1920 may be volatile memory (e.g., registers, cache, RAM), non-volatile memory (e.g., ROM, EEPROM, flash memory, etc.), or some combination of the two. The memory 1920 stores software 1980, images, and video that can, for example, implement the technologies described herein. A computing environment may have additional features. For example, the computing environment 1900 includes storage 1940, one or more input devices 1950, one or more output devices 1960, and one or more communication connections 1970. An interconnection mechanism (not shown) such as a bus, a controller, or a network, interconnects the components of the computing environment 1900. Typically, operating system software (not shown) provides an operating environment for other software executing in the computing environment 1900, and coordinates activities of the components of the computing environment 1900.

The storage 1940 may be removable or non-removable, and includes magnetic disks, magnetic tapes or cassettes, CD-ROMs, CD-RWs, DVDs, or any other medium which can be used to store information and that can be accessed within the computing environment 1900. The storage 1940 stores instructions for the software 1980, plugin data, and messages, which can be used to implement technologies described herein.

The input device(s) 1950 may be a touch input device, such as a keyboard, keypad, mouse, touch screen display, pen, or trackball, a voice input device, a scanning device, or another device, that provides input to the computing environment 1900. For audio, the input device(s) 1950 may be a sound card or similar device that accepts audio input in analog or digital form, or a CD-ROM reader that provides audio samples to the computing environment 1900. The output device(s) 1960 may be a display, printer, speaker, CD-writer, or another device that provides output from the computing environment 1900.

The communication connection(s) 1970 enable communication over a communication medium (e.g., a connecting network) to another computing entity. The communication medium conveys information such as computer-executable instructions, compressed graphics information, video, or other data in a modulated data signal. The communication connection(s) 1970 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1990. For example, disclosed compilers and/or block-based-processor servers are located in the computing environment 1930, or the disclosed compilers can be executed on servers located in the computing cloud 1990. In some examples, the disclosed compilers execute on traditional central processing units (e.g., RISC or CISC processors).

Computer-readable media are any available media that can be accessed within a computing environment 1900. By way of example, and not limitation, with the computing environment 1900, computer-readable media include memory 1920 and/or storage 1940. As should be readily understood, the term computer-readable storage media includes the media for data storage such as memory 1920 and storage 1940, and not transmission media such as modulated data signals.

XXII. Additional Examples of the Disclosed Technology

Additional examples are disclosed herein that can be implemented with reference to the foregoing detailed description.

In some examples of the disclosed technology, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an apparatus including a processor configured to execute a block-based processor instruction set, the apparatus including: memory configured to store an instruction block; and an instruction scheduler configured to: evaluate dependencies for individual instructions encoded for the instruction block, issue a respective instruction of the individual instructions when the respective instruction's dependencies indicate that the respective instruction is ready to issue, determine that at least one of the individual instructions can commit, and responsive to the determining, advance a commit frontier to indicate that the determined at least one individual instruction can commit Other examples of this aspect include corresponding computer systems, apparatus, and computer programs recorded on one or more computer storage devices, each configured to perform the actions of the methods.

Certain implementations can include one or more of the following features. The apparatus further including: a commit frontier register storing an indication of the current position of the commit frontier. The apparatus further including: a block commit circuit configured to: evaluate early termination criteria for the instruction block, and when the early termination criteria indicates the instruction block can commit: advance the commit frontier register to indicate that all instructions can commit and quash at least one defunct instruction. The apparatus further including: a dependency evaluation circuit that performs the determining by evaluating a predicate condition for one or more of the instructions. The apparatus further including: a dependency evaluation circuit that evaluates at least one input operand of the at least one of the individual instructions and, when it is determined that the at least one input operand will not be generated, determine that the at least one of the individual instructions can commit. The apparatus where: the individual instructions for the instruction block are encoded according to an order. The apparatus can also include examples where the respective instruction is outside the commit frontier when it is issued. Certain implementations of the described techniques can include hardware or computer readable instructions stored in a computer-readable storage devices, memory, or media.

One general aspect includes a method of operating a processor executing a block-based instruction set architecture, the method including: with the processor: executing at least one instruction encoded for an instruction block. The method of operating also includes responsive to determining that an individual instruction of the instruction block can commit, advancing a commit frontier for the instruction block to include all instructions in the instruction block that can commit. The method of operating also includes committing one or more instructions inside the advanced commit frontier. Other examples of this aspect include corresponding computer systems, apparatus, and computer-readable instructions recorded on one or more computer-readable storage devices, memory, or media, that cause a block-based processor perform the actions of the methods.

Certain examples can include one or more of the following features: determining that the individual instruction can commit by determining that the individual instruction's predicate condition is not satisfied. The method further including: determining that the individual instruction can commit by determining that at least one input operand of the individual instruction will not be received. The method further including: determining that the individual instruction can commit by receiving a null instruction signal indicating the instruction is defunct. The method where the individual instruction is a defunct instruction, and where the method further includes: evaluating the defunct instruction's dependencies to determine that the instruction will not execute. The method further including: evaluating early termination criteria for the block. The method can also include when the evaluating the early termination criteria indicates that the instruction block can commit, committing the instruction block prior to all instructions of the block completing execution. The method can be implemented where: the evaluating early termination criteria includes determining that no unexecuted instructions in the instruction block would affect the processor architectural state if executed. The method can be implemented where: the early termination criteria include at least one of: all instructions of the instruction block have been considered for issue, all issued persistent instructions have completed, all unissued persistent instructions are defunct, any executing instruction will not cause an exception, or the next block to execute has been identified. The method can be implemented where the instruction block is a first instruction block, the method further including: storing transient state of the first instruction block, the transient state including an indication of the current commit frontier. The method can also include receiving an exception event and processing the exception event by transferring control of the processor to a second instruction block; and after the processing the exception event, resuming execution of the first instruction block by restoring processor state including the current commit frontier using the stored transient state. The method can further include: executing a store conditional and a test instruction that receives a result of the store conditional instruction, the store conditional and the test instruction being encoded within the same, instruction block. Certain implementations of the described technology can include hardware or computer readable instructions stored in a computer-readable storage devices, memory, or media.

One general aspect includes a method of operating a processor executing a block-based instruction set architecture, the method including: with the processor: executing a portion of instructions of a first instruction block. The method of operating can also include receiving an exception event. The method of operating can also include storing transient state for the first instruction block, the transient state including an indication of a current commit frontier of the first instruction block. The method of operating can also include responsive to the exception event, processing the exception event by transferring control of the processor to a second instruction block. The method of operating can also include resuming execution of the first instruction block by restoring the stored transient state for the first instruction block and executing at least one unexecuted instruction of the first instruction block. Other examples of this aspect include corresponding computer systems, apparatus, and computer-readable instructions recorded on one or more computer-readable storage devices, memory, or media, that cause a block-based processor perform the actions of the methods.

Certain implementations can include one or more of the following features. The method further including: responsive to determining that at least one instruction of the executed portions of instruction block can commit, advancing a commit frontier for the instruction block to include the at least one instruction. The method further including committing one or more instructions inside the advanced commit frontier, the advance commit frontier being generated based on the restored transient state. The method further including: evaluating a predicate condition. The method can also include responsive to the evaluating, marking an instruction in the instruction block as defunct based on the predicate condition. The method can also include where the advancing the commit frontier is advanced at least to the instruction marked as defunct. The method where the transient state is stored in a memory including at least one of the following data: broadcast register values and valid bits indicating whether each of the respective broadcast register values is valid. The method can also include operand values and valid bits indicating whether each of the respective operand values is valid. The method can also include a computed branch target indicating a next instruction block; or values indicating write status of register write instructions. Certain implementations of the described technology can include hardware or computer readable instructions stored in a computer-readable storage devices, memory, or media.

One or more computer-readable storage media can store computer-readable instructions that when executed cause a computer to perform any of the disclosed methods for compiling instructions targeted for execution by a block-based processor. A block-based processor can be configured to execute computer-readable instructions generated by the method.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. An apparatus comprising a processor configured to execute a block-based processor instruction set, the apparatus comprising:
   memory configured to store an instruction block; and
   an instruction scheduler configured to:
      evaluate dependencies for individual instructions encoded for the instruction block,
      issue a respective instruction of the individual instructions when the respective instruction's dependencies indicate that the respective instruction is ready to issue,
      determining that at least one of the individual instructions can commit, and
      responsive to the determining, advancing a commit frontier to indicate that the determined at least one individual instruction can commit.

2. The apparatus of claim 1, further comprising:
   a commit frontier register storing an indication of the current position of the commit frontier.

3. The apparatus of claim 2, further comprising:
   a block commit circuit configured to:
      evaluate early termination criteria for the instruction block; and
      when the early termination criteria indicates the instruction block can commit:
         advancing the commit frontier register to indicate that all instructions can commit, and
         quashing at least one defunct instruction.

4. The apparatus of claim 1, further comprising:
   a dependency evaluation circuit that performs the determining by evaluating a predicate condition for one or more of the instructions.

5. The apparatus of claim 1, further comprising:
   a dependency evaluation circuit that evaluates at least one input operand of the at least one of the individual instructions and, when it is determined that the at least one input operand will not be generated, determining that the at least one of the individual instructions can commit.

6. The apparatus of claim 1, wherein:
   the individual instructions for the instruction block are encoded according to an order; and
   the respective instruction is outside the commit frontier when it is issued.

7. A method of operating a processor executing a block-based instruction set architecture, the method comprising:
   with the processor:
      executing at least one instruction encoded for an instruction block;
      responsive to determining that an individual instruction of the instruction block can commit, advancing a commit frontier for the instruction block to include all instructions in the instruction block that can commit; and
      committing one or more instructions inside the advanced commit frontier.

8. The method of claim 7, further comprising:
   determining that the individual instruction can commit by determining that the individual instruction's predicate condition is not satisfied.

9. The method of claim 7, further comprising:
   determining that the individual instruction can commit by receiving a null instruction signal indicating the instruction is defunct.

10. The method of claim 7, wherein the individual instruction is a defunct instruction, and wherein the method further comprises:
    evaluating the defunct instruction's dependencies to determine that the instruction will not execute.

11. The method of claim 7, further comprising:
    evaluating early termination criteria for the block; and
    when the evaluating the early termination criteria indicates that the instruction block can commit, committing the instruction block prior to all instructions of the block completing execution.

12. The method of claim 11, wherein:
    the evaluating early termination criteria comprises determining that no unexecuted instructions in the instruction block would affect the processor architectural state if executed.

13. The method of claim 11, wherein:
    the early termination criteria include at least one of: all instructions of the instruction block have been considered for issue, all issued persistent instructions have completed, all unissued persistent instructions are defunct, any executing instruction will not cause an exception, or the next block to execute has been identified.

14. The method of claim 7, wherein the instruction block is a first instruction block, the method further comprising:
- storing transient state of the first instruction block, the transient state comprising an indication of the current commit frontier;
- receiving an exception event and processing the exception event by transferring control of the processor to a second instruction block; and
- after the processing the exception event, resuming execution of the first instruction block by:
  - restoring processor state including the current commit frontier using the stored transient state.

15. The method of claim 7, further comprising:
- executing a store conditional and a test instruction that receives a result of the store conditional instruction, the store conditional and the test instruction being encoded within the same, instruction block.

* * * * *